United States Patent
Sethuraman et al.

(10) Patent No.: US 12,514,545 B2
(45) Date of Patent: Jan. 6, 2026

(54) COMPLETENESS OF VIEW OF ANATOMY IN ULTRASOUND IMAGING AND ASSOCIATED SYSTEMS, DEVICES, AND METHODS

(71) Applicant: KONINKLIJKE PHILIPS N.V., Eindhoven (NL)

(72) Inventors: Shriram Sethuraman, Lexington, MA (US); Jonathan Thomas Sutton, Boston, MA (US); Grzegorz Andrzej Toporek, Cambridge, MA (US); Shyam Bharat, Arlington, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/851,817

(22) PCT Filed: Mar. 22, 2023

(86) PCT No.: PCT/EP2023/057270
§ 371 (c)(1),
(2) Date: Sep. 27, 2024

(87) PCT Pub. No.: WO2023/186640
PCT Pub. Date: Oct. 5, 2023

(65) Prior Publication Data
US 2025/0213216 A1    Jul. 3, 2025

Related U.S. Application Data

(60) Provisional application No. 63/324,939, filed on Mar. 29, 2022.

(51) Int. Cl.
*A61B 8/00*    (2006.01)
*A61B 8/08*    (2006.01)

(52) U.S. Cl.
CPC .............. *A61B 8/42* (2013.01); *A61B 8/0883* (2013.01); *A61B 8/4488* (2013.01); *A61B 8/463* (2013.01); *A61B 8/469* (2013.01); *A61B 8/54* (2013.01)

(58) Field of Classification Search
CPC ....... A61B 8/42; A61B 8/0883; A61B 8/4488; A61B 8/463; A61B 8/469; A61B 8/54;
(Continued)

(56) References Cited

U.S. PATENT DOCUMENTS 6,006,126 A * 12/1999 Cosman ................. A61B 34/20
                                                       600/417
6,476,607 B1 * 11/2002 Dannels ............. G01R 33/4833
                                                       324/309
(Continued)

FOREIGN PATENT DOCUMENTS

EP       3298967 A1    3/2018
WO    2021209400 A1   10/2021

OTHER PUBLICATIONS

International Search Report and Written Opinion for PCT/EP2023/057270; Mailing date: Jun. 6, 2023, 9 Pages.

*Primary Examiner* — Sanjay Cattungal

(57) ABSTRACT

An ultrasound system includes a processor circuit that receives an ultrasound image obtained according to a set of ultrasound system settings. The processor circuit determines a quality index representative of the visibility of an anatomical feature for the ultrasound image. In response to determining that the quality index does not meet or exceed a threshold quality index, the processor circuit may provide an output for a new set of ultrasound system settings corresponding to an improvement in quality index. The processor circuit then receives an additional ultrasound image corresponding to the new ultrasound system settings, determines an additional quality index for the additional
(Continued)

ultrasound image, determines that the quality index exceeds the threshold quality index, and records the additional ultrasound image.

16 Claims, 12 Drawing Sheets

(58) Field of Classification Search
CPC ......... A61B 8/461; A61B 8/467; A61B 8/485; A61B 8/5207; A61B 8/5223; A61B 8/04
See application file for complete search history.

(56) References Cited

U.S. PATENT DOCUMENTS

| | | | |
|---|---|---|---|
| 8,081,227 B1 | 12/2011 | Kim | |
| 8,419,643 B2* | 4/2013 | Sarvazyan | A61B 8/0875 600/407 |
| 10,159,448 B2* | 12/2018 | Ishii | A61B 6/541 |
| 10,627,497 B2* | 4/2020 | Chen | A61B 8/06 |
| 10,795,007 B2* | 10/2020 | Bercoff | A61B 8/485 |
| 10,905,402 B2* | 2/2021 | Guenette | A61B 8/483 |
| 11,229,419 B2* | 1/2022 | Zou | G06F 18/214 |
| 11,419,585 B2* | 8/2022 | Aladahalli | A61B 8/5207 |
| 12,004,901 B2* | 6/2024 | Ulman | A61B 8/0866 |
| 2007/0043288 A1* | 2/2007 | Mueller | G01R 33/287 600/411 |
| 2007/0249934 A1* | 10/2007 | Aksit | G01R 33/34084 600/427 |
| 2010/0262008 A1 | 10/2010 | Roundhill | |
| 2012/0089008 A1* | 4/2012 | Strehl | G01R 33/286 600/411 |
| 2013/0033700 A1* | 2/2013 | Hallil | A61N 5/1071 378/63 |
| 2013/0060146 A1* | 3/2013 | Yang | A61B 90/39 600/476 |
| 2016/0066794 A1* | 3/2016 | Klinder | A61B 5/02028 600/424 |
| 2016/0102969 A1* | 4/2016 | Verstege | A61B 1/009 250/206 |
| 2018/0008351 A1* | 1/2018 | Schoenefeld | A61B 17/15 |
| 2018/0021097 A1* | 1/2018 | Quaid | A61B 34/10 600/407 |
| 2018/0132724 A1 | 5/2018 | Waechter-Stehle et al. | |
| 2020/0211174 A1 | 7/2020 | Rothberg et al. | |
| 2021/0145409 A1 | 5/2021 | Labyed | |

* cited by examiner

COMPLETENESS OF VIEW OF ANATOMY IN ULTRASOUND IMAGING AND ASSOCIATED SYSTEMS, DEVICES, AND METHODS

CROSS-REFERENCE TO PRIOR APPLICATIONS

This application is the U.S. National Phase application under 35 U.S.C. § 371 of International Application No. PCT/EP2023/057270, filed on Mar. 22, 2023, which claims the benefit of U.S. Provisional Patent Application No. 63/324,939, filed on Mar. 29, 2022. These applications are hereby incorporated by reference herein.

TECHNICAL FIELD

The present disclosure relates generally to ultrasound imaging. In particular, an ultrasound system provides guidance to a user to position an ultrasound imaging probe and adjusts imaging parameters to ensure high quality ultrasound images that provide a complete view of features of the anatomy of interest are obtained.

BACKGROUND

Physicians use many different medical diagnostic systems and tools to monitor a patient's health and diagnose and treat medical conditions. Ultrasound imaging systems are widely used for medical imaging and measurement. The ultrasound transducer probe may include an array of ultrasound transducer elements that transmit acoustic waves into a patient's body and record acoustic waves reflected from the internal anatomical structures within the patient's body, which may include tissues, blood vessels, and internal organs. The transmission and reception of acoustic waves, along with various beamforming and processing techniques, create an image of the patient's internal anatomical structures.

Ultrasound imaging is a safe, useful, and in some applications, non-invasive tool for diagnostic examination, interventions, and/or treatment. Ultrasound imaging can provide insights into an anatomy before a surgery or other major procedure is performed as well as monitor and/or track changes to a particular anatomical feature over time. Many ultrasound imaging systems capture and/or calculate dimensions of anatomical structures during an ultrasound examination.

Ultrasound imaging is used to quantify left ventricular filling pressure (LVFP). LVFP is a key hemodynamic indicator of diastolic dysfunction. Stiffening of the walls of the heart chambers is often associated with impaired function in the diastole and elevated filling pressures. Estimation of strains in the walls of the heart chambers using ultrasound can serve as a non-invasive surrogate measurement of filling pressures. Reliable LVFP estimation requires accurate strain measurements. To allow accurate strain measurements, ultrasound images of sufficiently high quality are needed. However, high quality ultrasound images may not be obtained in, for example, critical care scenarios, due to lack of expertise of a user, the need for rapid assessment, the patient environment not being conducive to thorough image acquisition, as well as various other factors. Low quality images make it difficult or impossible to accurately quantify LVFP and assess disease progression in a patient. In addition, mistakes made in image acquisition are often difficult or impossible to remedy afterwards. Less than ideal image acquisition leads to inaccurate measurements and may result in poor diagnosis or treatment decisions.

SUMMARY

Aspects of the present disclosure are systems, devices, and methods for providing guidance for optimizing ultrasound image acquisition. Aspects of the present disclosure advantageously assist a user of an ultrasound system to correctly position an ultrasound imaging probe, set ultrasound imaging system settings, and ultimately acquire high-quality ultrasound images that may be used to make accurate quantifications of a patient anatomy. Aspects of the present disclosure may be advantageous to ultrasound system users with little experience in ultrasound operation or users of an ultrasound system required to perform ultrasound imaging procedures within limited time constraints.

In some aspects, a processor circuit of an ultrasound imaging system outputs, on a display screens, instructions to a user for properly positioning an ultrasound imaging probe to obtain a complete view of the desired anatomy. While the probe is at its initial position, the probe receives ultrasound images, and these images are displayed to the user on the display screen. The processor circuit automatically identifies anatomical features of interest within the ultrasound images. In one example, the ultrasound images may display a view of a heart of a patient and the processor circuit may automatically identify mitral valve (e.g., left and right mitral annulus points) and a left atrial roof of the heart. The processor circuit also displays a visual indicator for each anatomical features. The visual indicators convey whether the anatomical features are displayed within an image as well as the image quality of the image at the location of the anatomical feature. If the anatomical features are displayed with sufficient quality, multiple images (e.g., an image loop or cine loop) are obtained and stored in a memory. For example, multiple images can be image frames that span the duration of at least one cardiac cycle. If one or more of the anatomical features are not displayed at all or are not displayed with sufficient quality, the ultrasound system settings are adjusted to improve the quality.

In some aspects, the processor circuit may automatically adjust the ultrasound system settings. In other aspects, the processor circuit displays instructions for a user to adjust the system settings. In other aspects, the processor circuit displays instructions for a user to adjust the position or orientation of the probe. After any of these settings are adjusted, more ultrasound images are received and the anatomical features are identified. If each anatomical feature is obtained with sufficient quality, an image loop may be stored in the memory. For example, the image loop can be recorded in response to a user input to record the image loop or automatically by the processor circuit based on the determination that the anatomical feature(s) are visible with sufficient quality. If the anatomical features are still not displayed with sufficient quality, the process may repeat until each anatomical feature is displayed satisfactorily.

In an exemplary aspect, a system is provided. The system comprises a processor circuit configured for communication with a transducer array and a display, wherein the processor circuit is configured to provide, to the display, a first user guidance to obtain a first ultrasound image of an anatomical feature with the transducer array; receive the first ultrasound image from the transducer array, wherein the first ultrasound image is obtained with a first set of one or more ultrasound parameters; provide, to the display, the first ultrasound image and a first visual indication associated with a first value of a quality index for the first ultrasound image, wherein the quality index is representative of a visibility of the anatomical feature; determine, when the first value does not satisfy a threshold value of the quality index, a second set of the one or more ultrasound parameters corresponding to an improvement in the quality index; provide, to at least one of the display or a beamformer in communication with the transducer array, an output associated with the second set of the one or more ultrasound parameters; receive a second ultrasound image from the transducer array, wherein the second ultrasound image is obtained with the second set of the one or more ultrasound parameters; and record the second ultrasound image when a second value of the quality index for the second ultrasound image satisfies the threshold value of the quality index.

In one aspect, the output associated with the second set of the one or more ultrasound parameters comprises a second user guidance for a user to manually change the one or more ultrasound parameters and the second user guidance is provided to the display. In one aspect, the output associated with the second set of the one or more ultrasound parameters comprises a control signal to automatically change the one or more ultrasound parameters and the control signal is provided to the beamformer. In one aspect, one or more ultrasound parameters comprise one or more of: a depth associated with an ultrasound image; a gain associated with the ultrasound image; a focus associated with the ultrasound image; a sector width associated with the ultrasound image; an imaging plane associated with the ultrasound image; a position of an ultrasound probe comprising the transducer array; or an orientation of the ultrasound probe. In one aspect, the first visual indication is overlaid on the first ultrasound image. In one aspect, the first visual indication is positioned at a location of the anatomical feature in the first ultrasound image. In one aspect, the processor is configured to provide, to the display, the second ultrasound image and a second visual indication associated with the second value of the quality index. In one aspect, a difference between the first visual indication and the second visual indication is representative of the improvement in the quality index. In one aspect, the anatomical feature comprises a plurality of anatomical features that are different from one another. In one aspect, the plurality of anatomical features are distributed around a perimeter of an anatomy such that the quality index is representative of a completeness of a view of the anatomy. In one aspect, the anatomy comprises a left atrium and the plurality of anatomical features comprises a left mitral annulus point, a right mitral annulus point, and a left atrial roof. In one aspect, the processor is configured to receive a user input to enter an imaging mode associated with the anatomical feature and the processor is configured to provide the first user guidance only after the imaging mode is entered. In one aspect, the first ultrasound image and the second ultrasound image are obtained during live imaging and the processor is configured to determine the second set of the one or more ultrasound parameters during the live imaging. In one aspect, the first ultrasound image comprises a first plurality of ultrasound images and the second ultrasound image comprises a second plurality of ultrasound images. In one aspect, an ultrasound probe comprising the transducer array.

In an exemplary aspect, a method is provided. The method comprises providing, to a display in communication with a processor, a first user guidance to obtain a first ultrasound image of an anatomical feature with a transducer array in communication with the processor; receiving, with the processor, the first ultrasound image from the transducer array, wherein the first ultrasound image is obtained with a first set of one or more ultrasound parameters; providing, with the processor, the first ultrasound image and a first visual indication associated with a first value of a quality index for the first ultrasound image to the display, wherein the quality index is representative of a visibility of the anatomical feature; determining, with the processor, a second set of the one or more ultrasound parameters corresponding to an improvement in the quality index, when the first value does not satisfy a threshold value of the quality index; providing, with the processor, an output associated with the second set of the one or more ultrasound parameters to at least one of the display or a beamformer in communication with the transducer array; receiving, with the processor, a second ultrasound image from the transducer array, wherein the second ultrasound image is obtained with the second set of the one or more ultrasound parameters; and recording, with the processor, the second ultrasound image when a second value of the quality index for the second ultrasound image satisfies the threshold value of the quality index.

Additional aspects, features, and advantages of the present disclosure will become apparent from the following detailed description.

BRIEF DESCRIPTION OF THE DRAWINGS

Illustrative aspects of the present disclosure will be described with reference to the accompanying drawings, of which.

DETAILED DESCRIPTION

Figure 1:
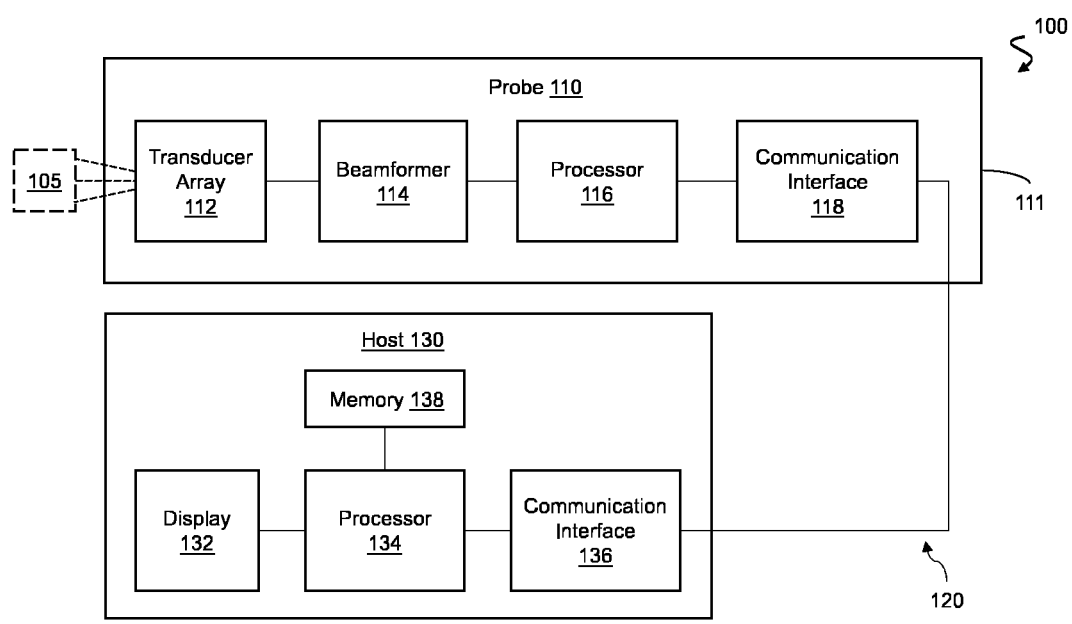
FIG. 1 is a schematic diagram of an ultrasound imaging system, according to aspects of the present disclosure.

For the purposes of promoting an understanding of the principles of the present disclosure, reference will now be made to the aspects illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations will not be described separately.

FIG. 1 is a schematic diagram of an ultrasound imaging system 100, according to aspects of the present disclosure. The system 100 is used for scanning an area or volume of a patient's body. The system 100 includes an ultrasound imaging probe 110 in communication with a host 130 over a communication interface or link 120. The probe 110 may include a transducer array 112, a beamformer 114, a processor circuit 116, and a communication interface 118. The host 130 may include a display 132, a processor circuit 134, a communication interface 136, and a memory 138 storing patient information.

In some aspects, the probe 110 is an external ultrasound imaging device including a housing 111 configured for handheld operation by a user. The transducer array 112 can be configured to obtain ultrasound data while the user grasps the housing 111 of the probe 110 such that the transducer array 112 is positioned adjacent to or in contact with a patient's skin. The probe 110 is configured to obtain ultrasound data of anatomy within the patient's body while the probe 110 is positioned outside of the patient's body. In some aspects, the probe 110 can be an external ultrasound probe and/or a transthoracic echocardiography (TTE) probe.

In other aspects, the probe 110 can be an internal ultrasound imaging device and may comprise a housing 111 configured to be positioned within a lumen of a patient's body, including the patient's coronary vasculature, peripheral vasculature, esophagus, heart chamber, or other body lumen or body cavity. In some aspects, the probe 110 may be an intravascular ultrasound (IVUS) imaging catheter or an intracardiac echocardiography (ICE) catheter. In other aspects, probe 110 may be a transesophageal echocardiography (TEE) probe. Probe 110 may be of any suitable form for any suitable ultrasound imaging application including both external and internal ultrasound imaging.

In some aspects, aspects of the present disclosure can be implemented with medical images of patients obtained using any suitable medical imaging device and/or modality. Examples of medical images and medical imaging devices include x-ray images (angiographic images, fluoroscopic images, images with or without contrast) obtained by an x-ray imaging device, computed tomography (CT) images obtained by a CT imaging device, positron emission tomography—computed tomography (PET-CT) images obtained by a PET-CT imaging device, magnetic resonance images (MRI) obtained by an MRI device, single-photon emission computed tomography (SPECT) images obtained by a SPECT imaging device, optical coherence tomography (OCT) images obtained by an OCT imaging device, and intravascular photoacoustic (IVPA) images obtained by an IVPA imaging device. The medical imaging device can obtain the medical images while positioned outside the patient body, spaced from the patient body, adjacent to the patient body, in contact with the patient body, and/or inside the patient body.

For an ultrasound imaging device, the transducer array 112 emits ultrasound signals towards an anatomical object 105 of a patient and receives echo signals reflected from the object 105 back to the transducer array 112. The ultrasound transducer array 112 can include any suitable number of acoustic elements, including one or more acoustic elements and/or a plurality of acoustic elements. In some instances, the transducer array 112 includes a single acoustic element. In some instances, the transducer array 112 may include an array of acoustic elements with any number of acoustic elements in any suitable configuration. For example, the transducer array 112 can include between 1 acoustic element and 10000 acoustic elements, including values such as 2 acoustic elements, 4 acoustic elements, 36 acoustic elements, 64 acoustic elements, 128 acoustic elements, 500 acoustic elements, 812 acoustic elements, 1000 acoustic elements, 3000 acoustic elements, 8000 acoustic elements, and/or other values both larger and smaller. In some instances, the transducer array 112 may include an array of acoustic elements with any number of acoustic elements in any suitable configuration, such as a linear array, a planar array, a curved array, a curvilinear array, a circumferential array, an annular array, a phased array, a matrix array, a one-dimensional (1D) array, a 1.xdimensional array (e.g., a 1.5 D array), or a two-dimensional (2D) array. The array of acoustic elements (e.g., one or more rows, one or more columns, and/or one or more orientations) can be uniformly or independently controlled and activated. The transducer array 112 can be configured to obtain one-dimensional, two-dimensional, and/or three-dimensional images of a patient's anatomy. In some aspects, the transducer array 112 may include a piezoelectric micromachined ultrasound transducer (PMUT), capacitive micromachined ultrasonic transducer (CMUT), single crystal, lead zirconate titanate (PZT), PZT composite, other suitable transducer types, and/or combinations thereof.

The object 105 may include any anatomy or anatomical feature, such as blood vessels, nerve fibers, airways, mitral leaflets, cardiac structure, abdominal tissue structure, appendix, large intestine (or colon), small intestine, kidney, liver, and/or any other anatomy of a patient. For example, the object 105 can be a heart, including one or more chambers of the heart (e.g., left atrium, left ventricle, right atrium, right ventricle), heart muscle defining one or more of the chambers, valves (e.g., mitral valve, tricuspid valve, pulmonary valve, etc.), and other structure of the heart. In some aspects, the object 105 may include at least a portion of a patient's large intestine, small intestine, cecum pouch, appendix, terminal ileum, liver, epigastrium, and/or psoas muscle. The present disclosure can be implemented in the context of any number of anatomical locations and tissue types, including without limitation, organs including the liver, heart, kidneys, gall bladder, pancreas, lungs; ducts; intestines; nervous system structures including the brain, dural sac, spinal cord and peripheral nerves; the urinary tract; as well as valves within the blood vessels, blood, chambers or other parts of the heart, abdominal organs, and/or other systems of the body. In some aspects, the object 105 may include malignancies such as tumors, cysts, lesions, hemorrhages, or blood pools within any part of human anatomy. The anatomy may be a blood vessel, as an artery or a vein of a patient's vascular system, including cardiac vasculature, peripheral vasculature, neural vasculature, renal vasculature, and/or any other suitable lumen inside the body. In addition to natural structures, the present disclosure can be implemented in the context of man-made structures such as, but without limitation, heart valves, stents, shunts, filters, implants and other devices.

The beamformer 114 is coupled to the transducer array 112. The beamformer 114 controls the transducer array 112, for example, for transmission of the ultrasound signals and reception of the ultrasound echo signals. In some aspects, the beamformer 114 may apply a time-delay to signals sent to individual acoustic transducers within an array in the transducer 112 such that an acoustic signal is steered in any suitable direction propagating away from the probe 110. The beamformer 114 may further provide image signals to the processor circuit 116 based on the response of the received ultrasound echo signals. The beamformer 114 may include multiple stages of beamforming. The beamforming can reduce the number of signal lines for coupling to the processor circuit 116. In some aspects, the transducer array 112 in combination with the beamformer 114 may be referred to as an ultrasound imaging component.

The processor 116 is coupled to the beamformer 114. The processor 116 may also be described as a processor circuit, which can include other components in communication with the processor 116, such as a memory, beamformer 114, communication interface 118, and/or other suitable components. The processor 116 may include a central processing unit (CPU), a graphical processing unit (GPU), a digital signal processor (DSP), an application specific integrated circuit (ASIC), a controller, a field programmable gate array (FPGA) device, another hardware device, a firmware device, or any combination thereof configured to perform the operations described herein. The processor 116 may also be implemented as a combination of computing devices, e.g., a combination of a DSP and a microprocessor, a plurality of microprocessors, one or more microprocessors in conjunction with a DSP core, or any other such configuration. The processor 116 is configured to process the beamformed image signals. For example, the processor 116 may perform filtering and/or quadrature demodulation to condition the image signals. The processor 116 and/or 134 can be configured to control the array 112 to obtain ultrasound data associated with the object 105.

The communication interface 118 is coupled to the processor 116. The communication interface 118 may include one or more transmitters, one or more receivers, one or more transceivers, and/or circuitry for transmitting and/or receiving communication signals. The communication interface 118 can include hardware components and/or software components implementing a particular communication protocol suitable for transporting signals over the communication link 120 to the host 130. The communication interface 118 can be referred to as a communication device or a communication interface module.

The communication link 120 may be any suitable communication link. For example, the communication link 120 may be a wired link, such as a universal serial bus (USB) link or an Ethernet link. Alternatively, the communication link 120 may be a wireless link, such as an ultra-wideband (UWB) link, an Institute of Electrical and Electronics Engineers (IEEE) 802.11 WiFi link, or a Bluetooth link.

At the host 130, the communication interface 136 may receive the image signals. The communication interface 136 may be substantially similar to the communication interface 118. The host 130 may be any suitable computing and display device, such as a workstation, a personal computer (PC), a laptop, a tablet, or a mobile phone.

The processor 134 is coupled to the communication interface 136. The processor 134 may also be described as a processor circuit, which can include other components in communication with the processor 134, such as the memory 138, the communication interface 136, and/or other suitable components. The processor 134 may be implemented as a combination of software components and hardware components. The processor 134 may include a central processing unit (CPU), a graphics processing unit (GPU), a digital signal processor (DSP), an application-specific integrated circuit (ASIC), a controller, an FPGA device, another hardware device, a firmware device, or any combination thereof configured to perform the operations described herein. The processor 134 may also be implemented as a combination of computing devices, e.g., a combination of a DSP and a microprocessor, a plurality of microprocessors, one or more microprocessors in conjunction with a DSP core, or any other such configuration. The processor 134 can be configured to generate image data from the image signals received from the probe 110. The processor 134 can apply advanced signal processing and/or image processing techniques to the image signals. In some aspects, the processor 134 can form a three-dimensional (3D) volume image from the image data. In some aspects, the processor 134 can perform real-time processing on the image data to provide a streaming video of ultrasound images of the object 105. In some aspects, the host 130 includes a beamformer. For example, the processor 134 can be part of and/or otherwise in communication with such a beamformer. The beamformer in the in the host 130 can be a system beamformer or a main beamformer (providing one or more subsequent stages of beamforming), while the beamformer 114 is a probe beamformer or micro-beamformer (providing one or more initial stages of beamforming).

The memory 138 is coupled to the processor 134. The memory 138 may be any suitable storage device, such as a cache memory (e.g., a cache memory of the processor 134), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, solid state drives, other forms of volatile and non-volatile memory, or a combination of different types of memory.

The memory 138 can be configured to store patient information, measurements, data, or files relating to a patient's medical history, history of procedures performed, anatomical or biological features, characteristics, or medical conditions associated with a patient, computer readable instructions, such as code, software, or other application, as well as any other suitable information or data. The memory 138 may be located within the host 130. Patient information may include measurements, data, files, other forms of medical history, such as but not limited to ultrasound images, ultrasound videos, and/or any imaging information relating to the patient's anatomy. The patient information may include parameters related to an imaging procedure such as an anatomical scan window, a probe orientation, and/or the patient position during an imaging procedure. The memory 138 can also be configured to store information related to the training and implementation of deep learning networks (e.g., neural networks) and/or information related to implementing image recognition algorithms for detecting/segmenting anatomy, image quantification algorithms, and/or image acquisition guidance algorithms, including those described herein.

The display 132 is coupled to the processor circuit 134. The display 132 may be a monitor or any suitable display. The display 132 is configured to display the ultrasound images, image videos, and/or any imaging information of the object 105.

The system 100 may be used to assist a sonographer in performing an ultrasound scan. The scan may be performed in a at a point-of-care setting. In some instances, the host 130 is a console or movable cart. In some instances, the host 130 may be a mobile device, such as a tablet, a mobile phone, or portable computer. During an imaging procedure, the ultrasound system can acquire an ultrasound image of a particular region of interest within a patient's anatomy. The ultrasound system 100 may then analyze the ultrasound image to identify various parameters associated with the acquisition of the image such as the scan window, the probe orientation, the patient position, and/or other parameters. The system 100 may then store the image and these associated parameters in the memory 138. At a subsequent imaging procedure, the system 100 may retrieve the previously acquired ultrasound image and associated parameters for display to a user which may be used to guide the user of the system 100 to use the same or similar parameters in the subsequent imaging procedure, as will be described in more detail hereafter.

In some aspects, the processor 134 may utilize deep learning-based prediction networks to identify parameters of an ultrasound image, including an anatomical scan window, probe orientation, patient position, and/or other parameters. In some aspects, the processor 134 may receive metrics or perform various calculations relating to the region of interest imaged or the patient's physiological state during an imaging procedure. These metrics and/or calculations may also be displayed to the sonographer or other user via the display 132.

Figure 2:
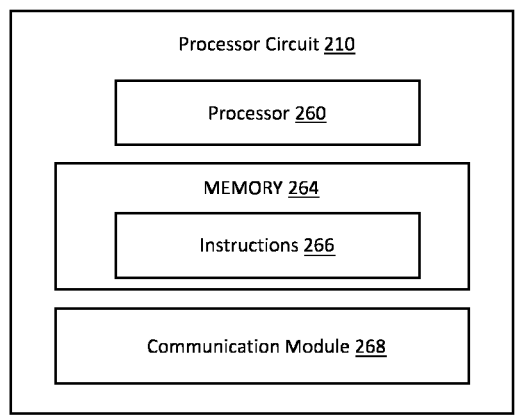
FIG. 2 is a schematic diagram of a processor circuit, according to aspects of the present disclosure.

FIG. 2 is a schematic diagram of a processor circuit, according to aspects of the present disclosure. One or more processor circuits can be configured to carry out the operations described herein. The processor circuit 210 may be implemented in the probe 110, the host system 130 of FIG. 1, or any other suitable location. For example, the processor 116 of the probe 110 can be part of the processor circuit 210. For example, the processor 134 and/or the memory 138 can be part of the processor circuit 210. In an example, the processor circuit 210 may be in communication with the transducer array 112, beamformer 114, communication interface 122, communication interface 136, and/or the display 132, as well as any other suitable component or circuit within ultrasound system 100. As shown, the processor circuit 210 may include a processor 260, a memory 264, and a communication module 268. These elements may be in direct or indirect communication with each other, for example via one or more buses.

The processor 260 may include a CPU, a GPU, a DSP, an application-specific integrated circuit (ASIC), a controller, an FPGA, another hardware device, a firmware device, or any combination thereof configured to perform the operations described herein. The processor 260 may also be implemented as a combination of computing devices, e.g., a combination of a DSP and a microprocessor, a plurality of microprocessors, one or more microprocessors in conjunction with a DSP core, or any other such configuration. The processor 260 may also include an analysis module as will be discussed in more detail hereafter. The analysis module may implement various deep learning networks and may be a hardware or a software implementation. The processor 260 may additionally include a preprocessor in either hardware or software implementation.

The memory 264 may include a cache memory (e.g., a cache memory of the processor 260), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 264 includes a non-transitory computer-readable medium. The memory 264 may store instructions 266. The instructions 266 may include instructions that, when executed by the processor 260, cause the processor 260 to perform the operations described herein with reference to the probe 110 and/or the host 130 (FIG. 1). Instructions 266 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements. Instructions 266 may include various aspects of a preprocessor, deep learning network, convolutional neural network (CNN) or various other instructions or code.

The communication module 268 can include any electronic circuitry and/or logic circuitry to facilitate direct or indirect communication of data between the processor circuit 210, the probe 110, and/or the host 130. In that regard, the communication module 268 can be an input/output (I/O) device. In some instances, the communication module 268 facilitates direct or indirect communication between various elements of the processor circuit 210 and/or the probe 110 (FIG. 1) and/or the host 130 (FIG. 1).

Figure 3:
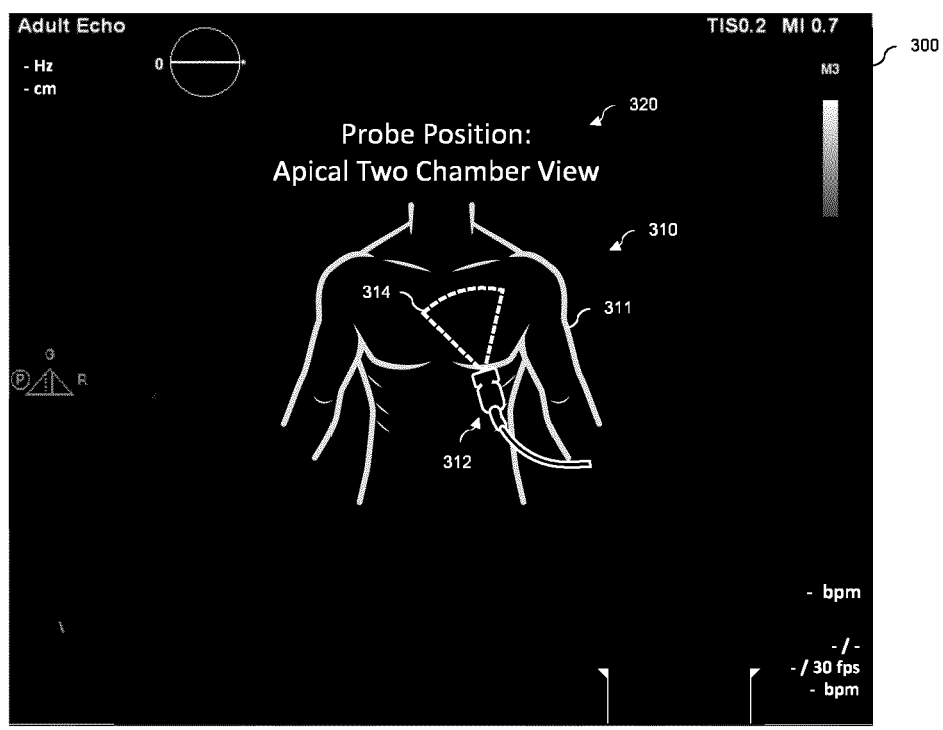
FIG. 3 is a diagrammatic view of a graphical user interface providing user guidance for ultrasound probe placement, according to aspects of the present disclosure.

FIG. 3 is a diagrammatic view of a graphical user interface (GUI) 300 providing user guidance for ultrasound probe placement, according to aspects of the present disclosure. The processor of the ultrasound system (e.g., the processor circuit 210 of FIG. 2) may be configured to provide guidance to obtain a left atrium-centric apical two or four chamber view of the patient's heart. In that regard, the GUI 300 can be a screen display that is generated by and output to the display 132 (FIG. 1) by the processor. In some aspects, the GUI 300 can be displayed in response to the processor receiving a user input to enter a mode (e.g., a quantitative evaluation) associated with a given anatomy or anatomical feature, such as a left ventricular filling pressure data acquisition mode (LVFP mode). The processor provides a series of GUIs to the display 132 (FIG. 1) that provide step-by-step instructions and feedback to the user on how to obtain ultrasound images for quantitative information to be reliably determined from the ultrasound images. The series of GUIs includes the GUI 300 (FIG. 3), GUI 500 (FIGS. 5 and 6), GUI 700 (FIG. 7), GUI 800 (FIG. 8), GUI 900 (FIG. 9), and GUI 1000 (FIG. 10).

As shown in FIG. 3, the processor circuit may be configured to provide a text indication 320 describing the probe position, which corresponds to the acoustic window inside the patient body that is being visualized in the ultrasound images. In FIG. 3, the text indication 320 identifies an apical two chamber view. In some aspects, guidance to the user may include additional text including steps of how to place the probe in the correct position.

Figure 11:
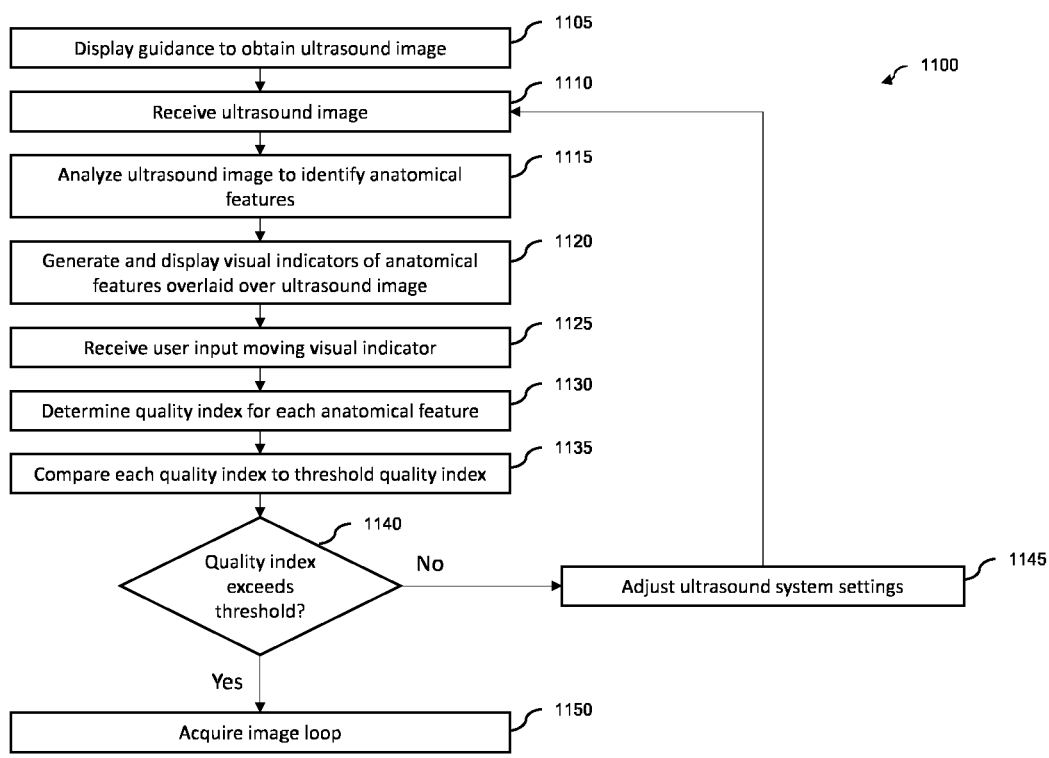
FIG. 11 is a flow diagram of a method of positioning an ultrasound image probe and adjusting ultrasound system parameters for acquiring an ultrasound image loop, according to aspects of the present disclosure.

As shown in FIG. 3, a graphical illustration 310 may additionally be displayed. The illustration 310 includes a depiction of a human anatomy 311, an ultrasound transducer 312, and a field of view 314 of the ultrasound transducer 312. The illustration 310 may provide the user with an efficient guide regarding the placement of the ultrasound probe. In some aspects, the illustration 310 may be a still image or may be a photograph, a video, or an animated or moving image. The illustration 310 may include various arrows or other indicators which may assist a user in determining the proper placement for the ultrasound probe. The graphical user interface 300 may additionally include any features described with reference to step 1105 of the method 1100 (FIG. 11).

In some aspects, the graphical user interface 300 is provided by the processor in response to various inputs or scenarios. For example, the graphical user interface 300 may be displayed to a user in response to a user powering on the ultrasound imaging system, a display of the system, or any other element of the ultrasound imaging system. The interface 300 may be displayed to a user in response to a user input selecting an LVFP mode or otherwise initiating a similar quantification or imaging procedure.

The user guidance described with reference to FIG. 3 may advantageously allow a user with little to no experience or training using the ultrasound imaging system to accurately place the ultrasound imaging probe to acquire high quality imaging data. In addition, the visual illustration 310 may advantageously provide a user in a time constrained environment with quick and efficient instructions.

Figure 4:
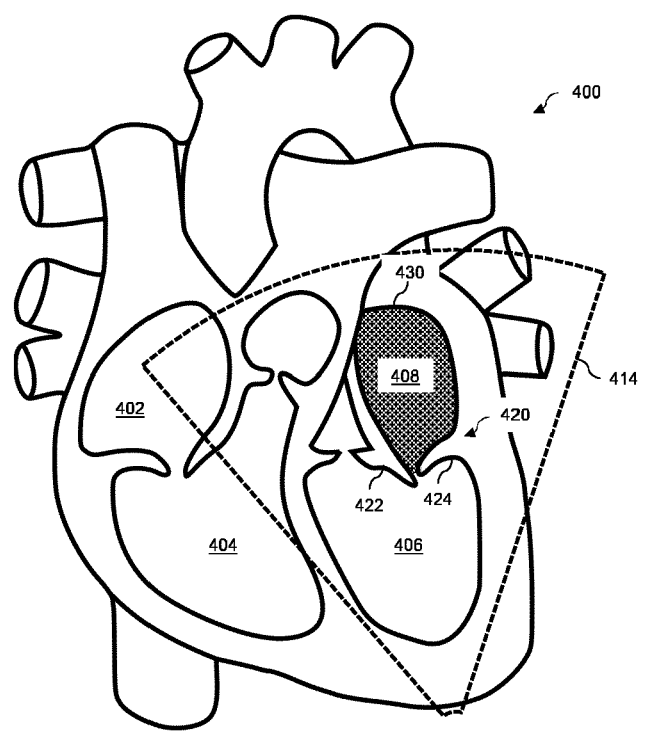
FIG. 4 is a diagrammatic view of an anatomy of a heart, according to aspects of the present disclosure.

FIG. 4 is a diagrammatic view of an anatomy of a heart 400, according to aspects of the present disclosure. The heart 400 shown in FIG. 4 may be exemplary of a heart of a patient. The heart 400 may include a right atrium 402, a right ventricle 404, a left ventricle 406, and a left atrium 408. In some examples, to acquire left ventricle filling pressure (LVFP) measurements, a view of the entire left atrium 408 may need to be acquired. The complete view of the left atrium 408 may be relevant for the LVFP because blood flows in the heart from the left atrium 408 into the left ventricle 406 when the mitral valve 420 is open. For example, a view of the entire left atrium 408 includes a view of the mitral valve 420 (represented by right mitral annulus point 422 and left mitral annulus point 424), as well as the left atrial roof 430. In some instances, the heart 400 and/or any chamber of the heart (e.g., the left atrium 408) can be referenced as anatomy, which has one or more anatomical features (e.g., mitral annulus points 422 and 424 and the left atrial roof 430). The mitral annulus points 422 and 424 and the left atrial roof 430 are distributed around a perimeter of the left atrium 408. As such, an ultrasound image that simultaneously shows the mitral annulus points 422 and 424 and the left atrial roof 430 can be considered to be a view of the entire left atrium 408. The view of the entire left atrium 408 can be a view of a largest cross-section of the left atrium 408 and/or imaging plane that passes through the mitral annulus points 422 and 424 and the left atrial roof 430.

A field of view 414 of an ultrasound imaging probe is also shown in FIG. 4. This field of view 414 may demonstrate an example field of view which includes the entire left atrium 408 along with all of the features previously described. Aspects of the present disclosure may include guidance to assist a user with little to no experience in the use of the ultrasound imaging system to acquire an ideal view of the left atrium 408. For example, the field of view 414 matches the field of view 314 (FIG. 3). The illustration 310 (FIG. 3) and the text indication 320 (FIG. 3) provide guidance to the user to position the ultrasound probe so that the field of view 314 includes the mitral annulus points 422 and 424 and the left atrial roof 430.

Figure 5:
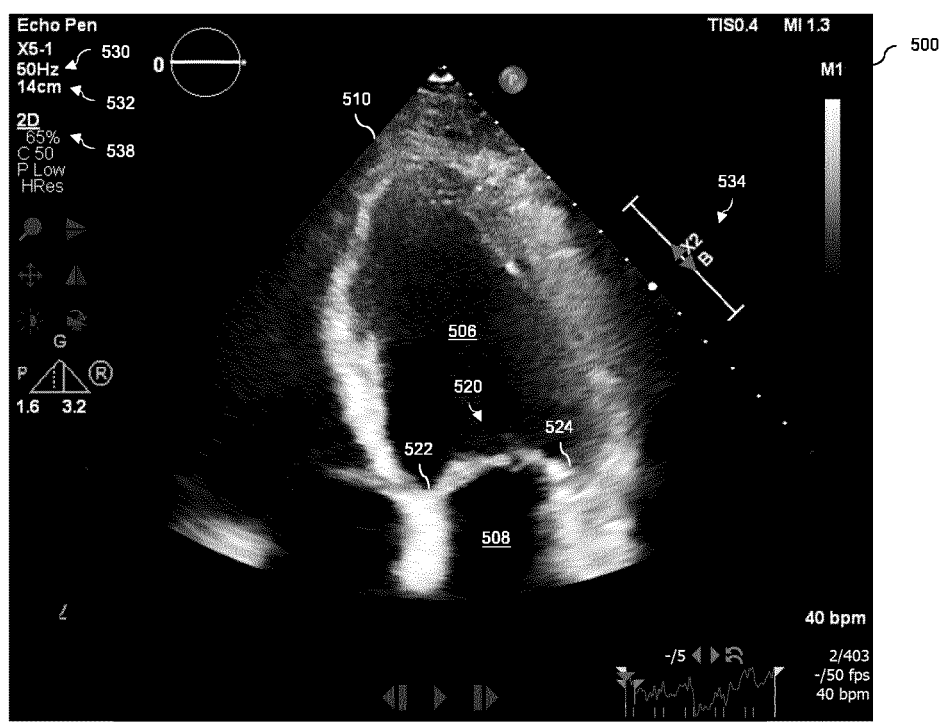
FIG. 5 is a diagrammatic view of a graphical user interface including an ultrasound image with a partial view of the left atrium, according to aspects of the present disclosure.

FIG. 5 is a diagrammatic view of a graphical user interface 500 including an ultrasound image 510 with a partial view of the left atrium 508, according to aspects of the present disclosure. The ultrasound image 510 shown within the graphical user interface 500 of FIG. 5 may be an exemplary ultrasound image obtained during an ultrasound imaging procedure. The ultrasound probe obtains ultrasound imaging data associated with multiple image frames, and the ultrasound image 510 is one such image frame. As shown, the image 510 may include a view of the left ventricle 506 and a partial view of the left atrium 508. Additionally shown within the image 510 is the mitral valve 520 with a mitral annulus points 522 and 524. Because the ultrasound image 510 illustrates an apical two chamber view (as shown in FIG. 3), the positions of the left ventricle and the left atrium are switched in FIG. 4 compared to their positions in FIG. 3. For example, the top of the ultrasound image 510 represents the anatomy closer to the ultrasound probe while the bottom of the ultrasound image 510 represents the anatomy farther away from the ultrasound probe. Because the left ventricle 506 is closer to the ultrasound probe with the apical two chamber view, the left ventricle 506 is near the top of the ultrasound image 510 while the left atrium 508 is near the bottom of the ultrasound image 510.

Also shown within the graphical user interface 500 may be various ultrasound parameters or settings. Aspects of the present disclosure provide a user of the system with guidance as to how to correct the field of view of the ultrasound imaging probe, including adjusting any of the parameters or settings described herein. For example, a frame rate 530 is shown within the graphical user interface 500. The frame rate 530 may correspond to the rate at which ultrasound images are obtained by the ultrasound imaging probe and/or displayed on the display 132 (FIG. 1).

The depth setting 532 of the ultrasound imaging probe is also shown. The depth setting 532 describes the distance of the imaged region from the transducer array of the ultrasound imaging probe into the body of the patient. A larger depth setting corresponds a greater distance into the body of the patient being shown in the ultrasound image 510, while a smaller depth setting corresponds to a lesser distance into the body of the patient being shown in the ultrasound image 510.

A focus setting 534 is also displayed adjacent to the image 510. The focus setting 534 can be a transmit focus associated with ultrasound energy transmitted by the ultrasound probe (e.g., a location within the patient body where the transmitted energy is focused) and/or a receive focus associated with processing of the reflected ultrasound echoes by the processor circuit (e.g., a location within the patient body that the processor circuit uses as the focus of the reflected ultrasound echoes received by the ultrasound probe). The focus setting 534 may determine the distance from the ultrasound imaging probe at which the ultrasound image 510 is provided with maximum clarity. The focus 534 may be moved closer to the ultrasound imaging probe or farther away from the ultrasound imaging probe.

A gain setting 538 is additionally displayed within the graphical user interface 500. The gain setting 538 may correspond to an amount of analog gain and/or digital gain applied to electrical signal representative of the ultrasound imaging data obtained by the ultrasound probe. The gain setting 538 may represent a mathematical function relating an input intensity associated with a pixel in the ultrasound image with an output intensity for the pixel. The gain setting 538 may be increased or decreased in some aspects. In some aspects, a shape of the gain curve (e.g., the mathematical function describing the relationship between the input intensity and the output intensity) can be changed. In some aspects, the gain setting 538 may be adjusted during image acquisition or may be adjusted during post processing of ultrasound imaging data.

Various other metrics and/or ultrasound parameters or settings may additionally be displayed within the graphical user interface 500. For example, the graphical user interface 500 may include parameters corresponding to viewing planes (e.g., elevation plane and/or azimuth plane) of the ultrasound imaging probe, sector width of the ultrasound image 510 (e.g., sector width 820 of FIG. 8 and/or sector width 920 of FIG. 9), probe position or orientation, or any other parameters.

One or more of the ultrasound parameters may be changed manually by a user through a user input (e.g., turning a knob or a touch input on a touchscreen). One or more of the ultrasound parameters may be changed automatically by the processor circuit. For example, the processor circuit can transmit a control signal to a beamformer (e.g., beamformer 114 and/or a beamformer of the host 130) to automatically change one or more of the ultrasound parameters.

Figure 6:
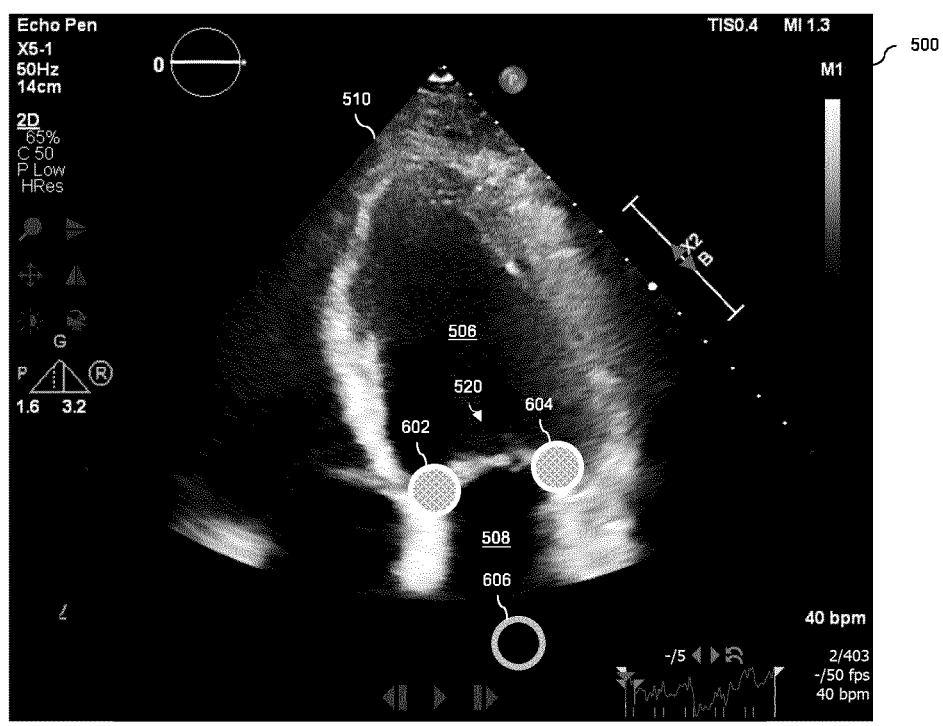
FIG. 6 is a diagrammatic view of a graphical user interface including an ultrasound image with a partial view of the left atrium, according to aspects of the present disclosure.

FIG. 6 is a diagrammatic view of a graphical user interface 500 including the ultrasound image 510 with a partial view of the left atrium 508, according to aspects of the present disclosure. The ultrasound image 510 is the same ultrasound image 510 as shown in FIG. 5. FIG. 6 illustrates various forms of user guidance in assisting a user to acquire an ideal or desired field of view of the ultrasound imaging probe. The ultrasound image 510 shows the entire left ventricle 506 and a partial view of the left atrium 508. As previously mentioned, in order to perform a left ventricle filling pressure quantification, an ultrasound image may need to include the left and right mitral annulus points as well as the left atrial roof. The image 510 includes a view of the left and right mitral annulus points (representing the mitral valve 520) but does not include a view of the left atrial roof due to non-ideal ultrasound system parameters.

To assist a user in remedying the field of view of the ultrasound system probe, the processor circuit may identify anatomical features within the image 510. For example, the processor circuit may automatically identify mitral annulus points and/or the left atrial roof of the left atrium 508 using imaging processing techniques and/or machine learning, such as those described with respect to FIG. 11. The processor circuit may place visual indicators, such as the indicators 602, 604, and 606 within the image 510. These visual indicators may identify for a user the locations of anatomical features within the image 510. The visual indicators 602, 604, and 606 can be overlaid on the ultrasound image 510.

In the example shown in FIG. 6, a visual indicator 602 identifies the location of the right mitral annulus point that has been determined by the processor circuit. Similarly, the visual indicator 604 identifies the location of the left mitral annulus point. However, due to the non-ideal field of view, the left atrial roof is not present within the image 510. To illustrate the missing left atrial roof, the processor circuit may be configured to display a visual indicator 606. The indicator 606 may be visually differentiated from the indicators 602 and 604 because the anatomical feature associated with the visual indicator signal 606 (e.g., the left atrial roof) is not displayed within the image 510.

The visual indicators 602, 604, and/or 606 may be of any suitable type. For example, the visual indicators may include circles, as shown in FIG. 6. The visual indicators may be of any suitable color, pattern, outline, or fill. In some aspects, the visual indicators may include other shapes, including geometric or non-geometric shapes, alphanumeric text, or any other visual elements. In some aspects, an additional visual indicator may be displayed corresponding to the mitral valve 520. Other visual indicators may also be displayed corresponding to other anatomical features within the image 510. In this way, the visual indicators may provide feedback to the user on the presence or absence of certain salient features such as mitral annulus points, left atrial roof, the mitral valve, etc.

In some aspects, the processor circuit may be additionally configured to determine a quality index associated with each anatomical feature displayed within an image 510. The quality index of an anatomical feature may correspond to the presence or absence of the anatomical feature within the displayed ultrasound image and/or the quality of the image at the location of the anatomical feature. In some aspects, the quality index may include both a geometric quality index and an image quality index. The geometric quality index may correspond to whether or not the anatomical feature is present within the image (as determined by the processor circuit). The image quality index may correspond to the overall clarity or accuracy of the image at or around the anatomical features. In some aspects, each anatomical feature displayed within an ultrasound image may be assigned an individual quality index. In some aspects, anatomical features which are not displayed within the ultrasound image, but which are expected to be present within the ultrasound image (e.g., for a particular ultrasound imaging procedure or quantification procedure), may also be assigned a quality index.

In the example shown in FIG. 6, the indicator 606 may be a red-colored visual indicator. The red color may correspond to the absence of the associated anatomical feature within the image 510. In addition, the processor circuit may be configured to estimate the location of an anatomical feature which is not present within the image 510 and place the associated visual indicator at the estimated location outside of the image 510, as shown in FIG. 6. In some aspects, the processor circuit may be configured to place the visual indicator of an anatomical feature not pictured within an ultrasound image along a perimeter of the image 510. In other aspects, a visual indicator of an anatomical feature not shown within the image may be placed at any other position within the graphical user interface 500. In some aspects, the indicators 602 and 604 may be illustrated in green. It is understood that any suitable colors may be used. The quality index can be provided in other ways as well. For example, numerical and/or textual indications of the quality index can be provided in GUI 500.

In some aspects, different parts of the indicators 602, 604, and/or 606 represent the presence of the anatomical features within the image 510 and the quality index of the anatomical features. For example, the visual appearance of an outline of the indicators 602, 604, and/or 606 depend on whether the anatomical feature is detected or not detected by the processor circuit in the image 510. For example, the outline of the indicators 602 and 604 can be green (indicating that the corresponding anatomical features have been detected by the processor circuit) while the outline for the indicator 606 is red (indicating that the corresponding anatomical feature has not been detected by the processor circuit). As another example, the interior or fill of the indicators 602, 604, 606 can relate to the quality index of the anatomical feature. For example, the color inside the indicators 602 and 604 can indicate the quality indices for the annulus points that are detected by the processor circuit in the image 510. In contrast, the interior of the indicator 606 may not be filled in at all because left atrial roof is not present within the image 510, which in some aspects results in no quality index being determined for that anatomical feature. In some aspects, visual appearance of the outline and/or fill of the indicators 602, 604, and/or 606 can depend on the confidence associated with the processor circuit's determination that the anatomical feature is present/absent and/or the quality index.

In some aspects, a geometric quality index may be a value within a range of values. The value of the geometric quality index may correspond to the certainty with which the processor circuit has identified the corresponding anatomical feature within the image 510. The visual representation of any of the visual indicators 602, 604, and/or 606 may be adjusted based on the value of the geometric quality index.

An image quality index may also be determined by the processor circuit. Similarly, the image quality index may be a value within a range and the visual representations of the indicators 602, 604, and or 606 may be based on the value of the image quality index within the range.

The quality index of any anatomical feature described with reference to FIG. 6, including a geometric quality index or an image quality index, may be determined according to any of the methods described with reference to step 1130 of the method 1100 of FIG. 11.

FIG. 6 illustrates a view of the patient anatomy in which the annulus points are visible, but the left atrial roof is not, and the image does not contain the entire atrium 508. However, in other aspects, what the processor circuit determines to be the left atrial roof may be visible but not of sufficient quality. In some aspects, the atrium may be foreshortened, which leads to insufficient quality. A foreshortened atrium may be detected by identifying a part of the atrium near the actual left atrial roof that moves through the cardiac cycle as a result of the contraction and expansion of the heart. A left atrial roof that is not foreshortened is typically stationary throughout the cardiac cycle. In that regard, the processor circuit may identify a part of the atrium that appears to be the left atrial roof, but is not actually the left atrial roof because multiple image frames show that the anatomy the processor has identified is moving in and out of the field of view during the cardiac cycle. In other aspects, the atrium and its features may be visible but the quality may be sub-optimal. Any of these scenarios, or other scenarios, may correspond to a non-ideal field of view of the ultrasound imaging probe and may lead to inaccurate measurements. As will be described with reference to FIG. 7, the processor circuit may be configured to automatically remedy various ultrasound imaging parameters or settings to fix any of these shortcomings or may provide recommendations to the user of the system to make the same or additional adjustments.

Figure 7:
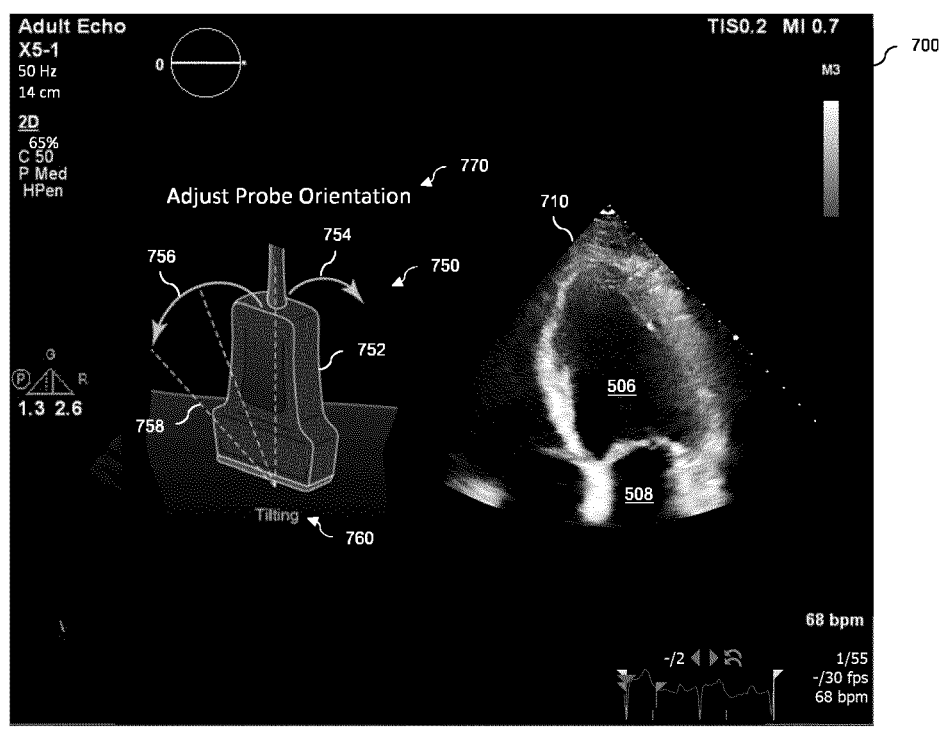
FIG. 7 is a diagrammatic view of a graphical user interface providing user guidance for ultrasound probe placement, according to aspects of the present disclosure.

FIG. 7 is a diagrammatic view of a graphical user interface 700 providing user guidance for ultrasound probe placement, according to aspects of the present disclosure. FIG. 7 includes a view of an ultrasound image 710. The ultrasound image 710 may be similar to the image 510 described with reference to FIG. 5 and FIG. 6. For example, the image 710 includes a view of the left ventricle 506 as well as a partial view of the left atrium 508.

In some aspects, the processor circuit may be configured to recommend adjustments to ultrasound system parameters to improve the quality index of various anatomical features within an ultrasound image or to improve the field of view of the ultrasound imaging probe.

In the example shown in FIG. 7, the processor circuit may provide guidance for probe re-positioning or re-orientation such as adjusting an anterior-posterior tilt to optimize the appearance of the anatomical features. The guidance directs the user to manually adjust one or more ultrasound parameters. This guidance may include text instructions such as the instruction 770, as well as visual instructions 750. As shown in FIG. 7, visual instructions 750 may include a depiction of an ultrasound imaging probe 752. The visual instruction 750 may additionally include arrows 754 and/or 756 indicating to a user to adjust the tilt or orientation of the imaging probe 752 in any suitable direction (e.g., forward, back, left, right). In some aspects, the processor circuit may determine, based on the anatomical features detected in the image 710, which direction the imaging probe should be tilted. The processor circuit may then display either the arrow 754 or the arrow 756 accordingly. In some aspects, lines 758 may be displayed to a user to indicate to what extent the ultrasound imaging probe should be tilted. In some aspects, additional text 760 may indicate what type of probe orientation maneuver is to be performed. For example, the text 760 may refer to tilting, rotating, sliding, rocking, sweeping, fanning, or any other maneuver. Similarly, arrows or lines such as the arrows 754 or 756 or the lines 758 may be displayed to a user associated with any other maneuvers to illustrate how the maneuver is to be accomplished as well as to what extent probe orientation should be adjusted.

While the visual instructions 750 and/or the instruction 770 can also provide user guidance to manually change (e.g., provide a user input to change) any of the gain setting, depth setting, focus setting, imaging plane selection of the ultrasound imaging probe, sector width, or any other parameters to improve the field of view. In some aspects, the processor circuit may also automatically adjust various settings or parameters of the ultrasound system to improve the quality index of any of the anatomical features within the ultrasound image. For example, the processor circuit may auto adjust any of the gain setting, depth setting, focus setting, imaging plane selection of the ultrasound imaging probe, sector width, or any other parameters to improve the field of view. Adjusting these settings may include generating and transmitting an instruction to the beamformer to adjust delays of transmitting ultrasound pulses or receiving ultrasound echoes. In instances in which the processor circuit automatically adjusts ultrasound parameters, the instructions 750 and/or 770 may also be displayed to inform and/or educate the user about the changes to the ultrasound parameters that are being made. In some aspects, the processor circuit may request confirmation via user input prior to changing to ultrasound parameters. In such aspects, the changes to the ultrasound parameters are semi-automatic in that the changes to the ultrasound parameters that need to be made to improve image quality are automatically determined by the processor circuit and the user input confirms that the changes should be made (in contrast to the user providing user input to manually change the ultrasound parameters). In some aspects, adjusting the imaging plane may include using out-of-plane diverging beams.

In one example, referring again to FIG. 5, to bring the left atrial roof into the field of view of the ultrasound imaging probe, the processor circuit may automatically adjust a depth setting 532. In some aspects, the depth setting 532 may be adjusted until the left atrial roof is brought into view and at least two centimeters beyond the left atrial roof are visible. In some aspects, the processor circuit may alternatively provide instructions to the user to manually adjust the depth to bring the left atrial roof into view.

In an example in which the left atrial roof may be visible but not of sufficient image quality, the focus 534 (FIG. 5) may also be adjusted such that the focus corresponds to the region of the atrium 508. Alternatively, instructions may be provided to the user to manually adjust the focus. In some aspects, the focal depth should be adjusted so as to be just beyond the mitral valve.

In another aspect, when the ultrasound imaging probe includes a 2D matrix probe, the processor circuit 210 may provide instructions to the beamformer to automatically scan through the elevation planes and select the elevation plane corresponding to the best quality. Optionally, oblique image planes and/or azimuthal image planes may also be similarly evaluated.

In an example in which the atrium may be foreshortened, the processor circuit may be configured to automatically scan different planes of elevation of the ultrasound probe. The processor circuit may then analyze ultrasound images received from each plane of elevation and determine that a plane of elevation corresponds to a correction of the foreshortened atrium, or that the left atrial roof is substantially stationary within a particular plane of elevation. In other aspects, instructions may be provided to the user to adjust the tilt of the ultrasound imaging probe as shown and described with reference to FIG. 7.

In an example in which the clarity of the image 510 is not satisfactory, a gain setting may be adjusted. A gain adjustment may be performed automatically in response to a signal or instruction from the processor circuit or instructions may be provided to a user to adjust the gain.

In some aspects, adjusting the ultrasound system settings may include adjusting the frame rate of the ultrasound imaging probe and/or adjusting the sector width of the imaging probe. In some aspects, adjusting the system settings may include automatically scanning through planes of elevation or azimuth. Adjusting the sector width may also be based on the location of the left atrial roof and mitral annulus points. For example, a smaller sector width that includes all of the left atrium (e.g., the left atrial roof and the mitral annulus points), while omitting other parts of the heart, can be selected. In some aspects, the sector size is optimized to produce the best possible frame rate during frame capture. For example, a relatively higher frame rate can be used with a relatively smaller sector width.

Figure 8:
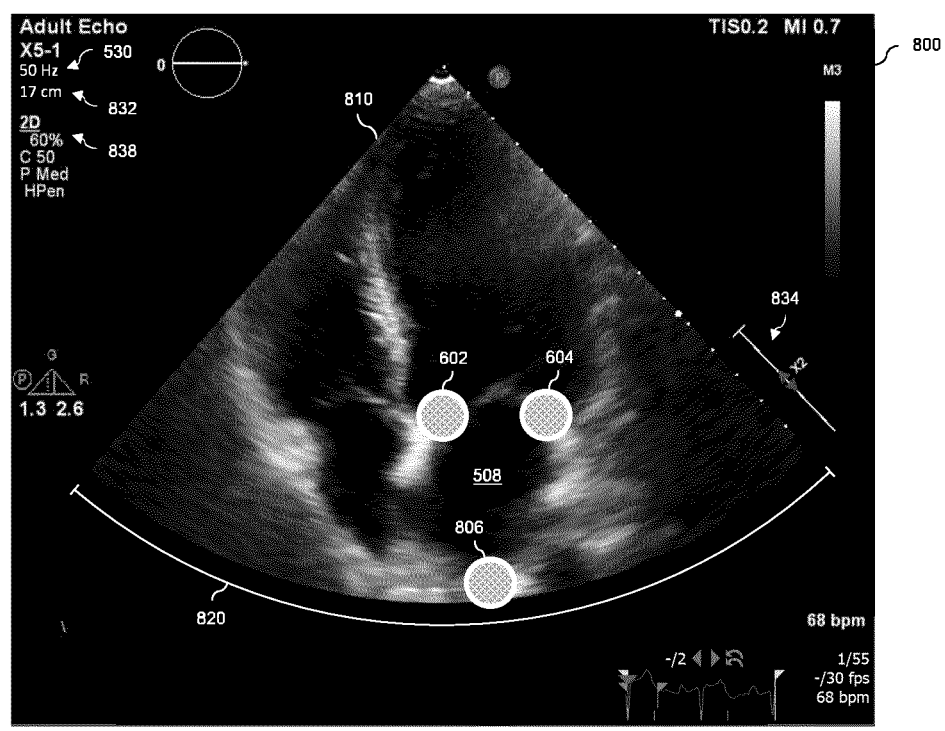
FIG. 8 is a diagrammatic view of a graphical user interface including an ultrasound image with a view of the left atrium, according to aspects of the present disclosure.

FIG. 8 is a diagrammatic view of a graphical user interface 800 including an ultrasound image with a view of the left atrium 508, according to aspects of the present disclosure. The graphical user interface 800 shown in FIG. 8 includes an ultrasound image 810. The ultrasound image 810 may include a modified field of view of the ultrasound imaging probe. For example, the ultrasound image 810 may correspond to an ultrasound image obtained after ultrasound system parameters or settings have been adjusted, according to any of the principles described with reference to FIG. 6 or FIG. 7. These adjustments have been determined by the processor circuit to provide a better quality index value for the anatomical feature(s).

In one example, a depth associated with the ultrasound image and/or the ultrasound imaging probe has been modified such that the entire atrium 508 is displayed within the image 510. The depth setting 832 in FIG. 8 is 17 cm, while the depth setting 532 in FIG. 5 is 14 cm. The additional 3 cm of depth in FIG. 8 allows for field of view of the ultrasound image 810 to include the atrial roof. In other situations, the depth setting may be decreased to provide a better quality index value for the anatomical feature(s) and/or to allow for higher frame rates of the ultrasound imaging system.

In another example, a focus associated with the ultrasound image and/or the ultrasound imaging probe has been adjusted to be closer to the left atrium 508 and/or the mitral valve. The focus 834 in FIG. 8 has been moved deeper into the field of view, which is closer to the left atrium 508 and/or the mitral valve, compared to location the focus 534 in FIG. 5. This change in the focus setting may provide a better image resolution and/or clarity for the structure surrounding and/or defining the left atrium, which is an exemplary anatomy of interest for LVFP quantification. In other situations, the focus 834 is moved to a more shallow location in the field of view that is closer to the probe to provide a better quality index value for the anatomical feature(s).

As another example, the gain associated with the ultrasound image and/or the ultrasound imaging probe has been modified. The gain 838 in FIG. 8 is 60%, while the gain 538 in FIG. 5 is 65%. The gain 538 of 65% may oversaturate the image, which may prevent processor circuit for properly distinguishing the anatomical features of interest from other anatomy in the image and/or quantifying various physiological parameters associated with those anatomical features (such as LFVP). The decrease in gain to 60% may provide a better image quality for the anatomical features to be identified and/or physiological parameters to be quantified. In other situations, the gain is increased to provide a better quality index value for the anatomical feature(s).

As shown in FIG. 8, the ultrasound image 810 includes the visual indicators 602 and 604, each corresponding to an mitral annulus point. The image 810 also includes a visual indicator 806. As previously described with reference to the visual indicator 606 (FIG. 6), the visual indicator 806 may correspond to the location of the left atrial roof of the left atrium 508 (determined by the processor circuit). The visual indicator 806 may differ from the visual indicator 606 in appearance because the left atrial roof is present within the image 810 as shown in FIG. 8. For example, the visual indicator 806 is green and filled in, compared to the red outline of visual indicator 606. As previously described, the visual appearance of any of the visual indicators shown in the graphical user interface 800 may correspond to the quality index of the anatomical features within the image 810.

FIG. 8 also includes a sector width 820. As previously described, the sector width of the ultrasound image may be included as a parameter or setting of the ultrasound imaging system. In that regard, the sector width 820 may be provide a relatively wider field of view that includes the left atrium 508, as well as other anatomical features of the heart to the left and right in the ultrasound image 810.

In some aspects, anatomical features identified within an ultrasound image, such as the image 810 of FIG. 8, may be incorporated into various quantification algorithms. For example, the anatomical features identified within the image may be used in a left ventricle filling pressure (LVFP) quantification. In other examples, however, the anatomical features, such as those shown in the graphical user interface 800, or any other anatomical features of the present disclosure, may be stored in a memory in communication with the processor circuit (e.g., as two-point coordinates in a 2D image identifying the location within an image at which the anatomical features was detected). These anatomical features and corresponding locations may be used in additional quantification procedures associated with the patient anatomy. These additional quantification procedures may be performed based on images received during the same imaging procedure as those of a left ventricle filling pressure quantification or may be based on images received during a previous or subsequent imaging procedure. For instance, anatomical features could be used to initialize an endocardial wall segmentation algorithm with a statistical template.

Figure 9:
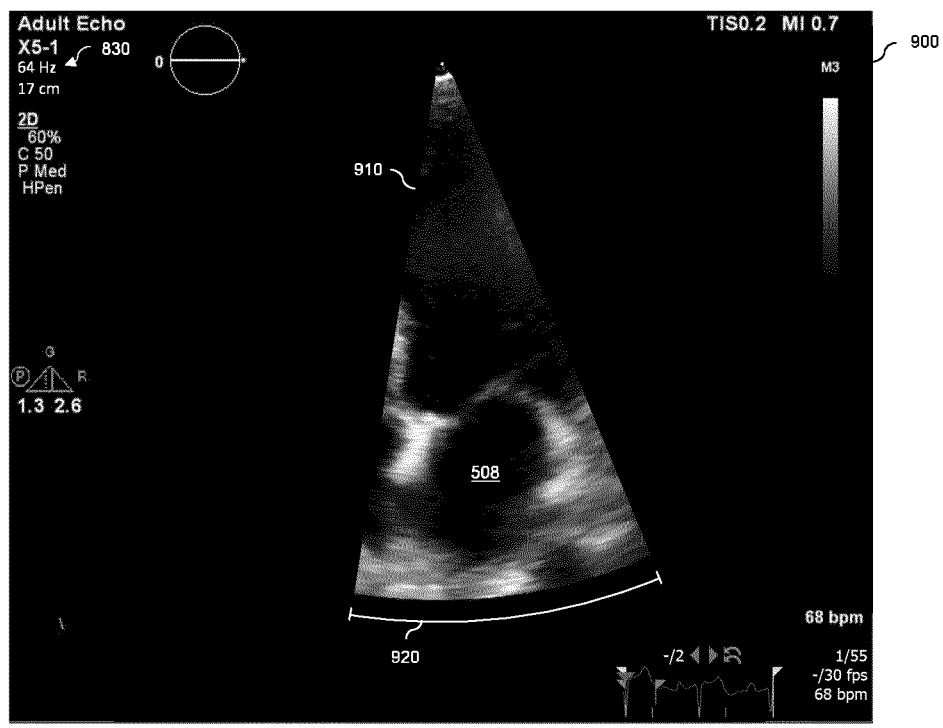
FIG. 9 is a diagrammatic view of a graphical user interface including an ultrasound image with a view of the left atrium, according to aspects of the present disclosure.
Figure 10:
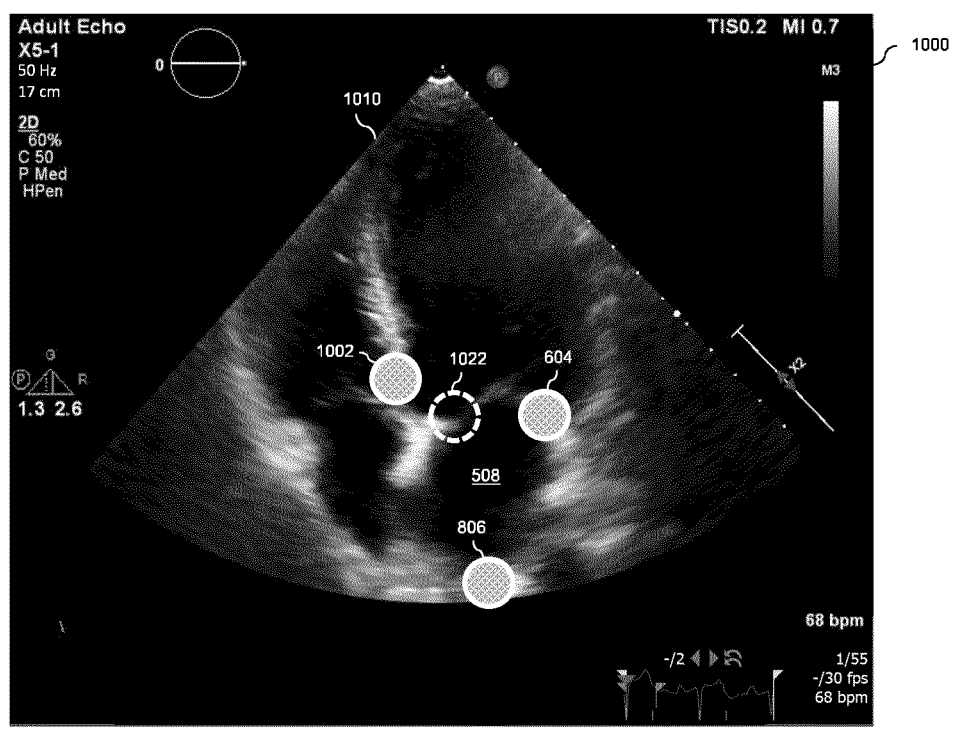
FIG. 10 is a diagrammatic view of a graphical user interface including an ultrasound image with a view of the left atrium, according to aspects of the present disclosure.

FIG. 9 is a diagrammatic view of a graphical user interface 900 including an ultrasound image 910 with a view of the left atrium, according to aspects of the present disclosure. The ultrasound image 910 shown in the graphical user interface 900 may be an example of an ultrasound image in which the sector width of the image has been reduced or optimized. As previously mentioned, in some aspects, the sector width of an ultrasound image may be reduced so that the frame rate of the ultrasound imaging probe may be increased. This increase in the frame rate may lead to more accurate measurements or quantifications based on the image. The image 910 has a sector width 920. The sector width 920 is relatively smaller compared to the sector width 820 in FIG. 8. Correspondingly, the frame rate 830 associated with the ultrasound image 910 is 64 Hz, which is higher than the frame rate 530 of 50 Hz in FIGS. 5 and 8.

In some aspects, after the quality index associated with various anatomical features of the patient anatomy are of a satisfactory quality, the processor circuit 210 may be configured to automatically adjust the sector width of an ultrasound image. This automatic adjustment may be based on the locations of the anatomical features within the image. For example, the processor circuit may adjust the sector width such that a full view of the left atrium 508 is present within the image, but little to no additional image content is present to either side of the left atrium 508. In some aspects, the sector width is adjusted so that a predefined amount of image content is present on the sides of the left atrium 508, such as a distance (e.g., 2 cm) around the left atrium 508. In some aspects, this automatic resizing of the sector width of the ultrasound image may be performed prior to recording an image loop. In some aspects, the processor circuit outputs user guidance to manually change the sector width, and the sector width is changed in response to a user input to do so.

FIG. 10 is a diagrammatic view of a graphical user interface 1000 including an ultrasound image 1010 with a view of the left atrium 508, according to aspects of the present disclosure. The graphical user interface 1000 shown in FIG. 10 may illustrate a scenario in which a visual indicator corresponding to an anatomical feature is moved in response to a user input.

As shown in FIG. 10, the graphical user interface 1000 includes the visual indicator 604 corresponding to the left mitral annulus point, an indicator 806 corresponding to the left atrial roof, and an indicator 1002. In some aspects, the indicator 1002 is positioned in the ultrasound image 1010 where the processor circuit has determined to be the right mitral annulus point. However, as shown in FIG. 10, the visual indicator 1002 may not be positioned at the actual location of the corresponding mitral annulus point. Incorrect placement of the visual indicator 1002 may occur as a result of the insufficient image quality that the processor circuit is unable to accurately determine the location of the right mitral annulus point. A user may recognize the incorrect placement of the visual indicator 1002 and manually correct it. The processor circuit 210 may be configured to receive a user input selecting a new location for the visual indicator 1002. For example, the user of the system may provide a user input selecting the indicator 1002 and moving the indicator 1002 to the location the user has identified to be the right mitral annulus point. The indicator 1022 shown in FIG. 10 may correspond to a location selected by the user. In response to this user input, the processor circuit may move the indicator 1002 to the location of the indicator 1022. The new location of the indicator 1022 can be used subsequently by the processor circuit to verify that the complete view of the left atrium 508 has shown with a sufficient quality index and/or perform quantitative analysis.

In some aspects, the processor circuit may prompt a user of the system to adjust or move the location of visual indicators when the visual indicators correspond to quality indices of low or moderate confidence. Allowing a user of the system to adjust the position of visual indicators may provide an improvement to the quantification step. In addition, such functionality could be beneficial when image re-acquisition is not possible, for instance due to time constrains, or lack of patient cooperation. In other aspects, the processor circuit may display to a user various controls to allow the user to move a visual indicator within the image 1010. For example, the processor circuit may display a set or arrows (e.g. four arrows pointing in four directions) that once clicked would increment the visual indicator position in a selected direction.

FIG. 11 is a flow diagram of a method 1100 of positioning an ultrasound image probe and adjusting ultrasound system parameters for acquiring an ultrasound image loop, according to aspects of the present disclosure. As illustrated, the method 1100 includes a number of enumerated steps, but aspects of the method 1100 may include additional steps before, after, or in between the enumerated steps. In some aspects, one or more of the enumerated steps may be omitted, performed in a different order, or performed concurrently. The steps of the method 1100 can be carried out by any suitable component within the system 100 and all steps need not be carried out by the same component. In some aspects, one or more steps of the method 1100 can be performed by, or at the direction of, a processor circuit, including, e.g., the processor 116 (FIG. 1), the processor 134 (FIG. 1), the processor 260 (FIG. 2) or any other suitable component.

At step 1105, the method 1100 includes displaying guidance to obtain an ultrasound image. In some aspects, the processor of the ultrasound system (e.g., the processor circuit 210 of FIG. 2) may be configured to provide guidance to obtain a left atrium-centric apical two or four chamber view of the patient's heart. In some aspects, the processor circuit may be configured to guide the user to obtain any other view of any other organ, structure, or other region of the patient anatomy. In some aspects, the processor circuit may guide a user to position the probe of the ultrasound system to obtain any suitable views, including but not limited to transthoracic acoustic windows, including an apical, parasternal, subcostal, or suprasternal window. Other probe views are also contemplated.

In some aspects, the processor circuit may be configured to output to the display a view including multiple views, including any of those listed herein or other views. The user may select a view from these multiple views. In response to the selection, the processor circuit may provide the user with guidance to position the probe in the corresponding location relative to the patient anatomy.

As an example, when the user enters the appropriate mode for obtaining a view of the left atrium of the patient's heart, for example to measure a left atrium index or left atrium strain, indication is provided to the user to place the probe to obtain the apical chamber views.

In some aspects, the processor circuit may be configured to instruct the user to place the ultrasound probe to obtain an apical view in response to a selection of a left ventricular filling pressure data acquisition mode (LVFP mode). In the LVFP mode, the ultrasound system may be configured to acquire cine loops of the cardiac chambers with the probe placed to get the apical views. A cine loop may include multiple cine images (ultrasound image frames) obtained in succession. A cine image may include an ultrasound image obtained with or without contrast. In various aspects, a cine loop may be acquired in the LVFP mode, as explained, or in any other mode, including during a data acquisition process corresponding to any other structure or region of the patient anatomy.

At step 1105, the acquisition settings of the ultrasound system may be auto populated to default values, values which may be pre-determined by the user of the ultrasound system or any other person of skill in the art, or may be based on institutional guidelines (e.g., hospital guidelines). In some aspects, the processor circuit of the system may adjust these auto-populated values (e.g., automatically and/or in response to a user input) during or before an ultrasound imaging procedure.

In some aspects, after a user selects the LVFP mode (e.g., a LVFP quantification mode), for example for the purpose of left atrial strain quantification, the user is presented with a direction to obtain the chamber views by placing probe in the apical view. A step-by-step instruction could be displayed to obtain an apical chamber view.

The instruction or guidance provided to the user may be displayed or otherwise communicated in any way. For example, as shown in FIG. 3 described previously, the instruction or guidance may include a visual representation of an exemplary patient anatomy and a visual representation of an ultrasound probe in the correct position. In other aspects, guidance may include text displayed on a display device providing the user with the name of the acoustic window used by ultrasound professionals, description of the probe position, descriptive steps or landmarks which may assist a user in properly placing the probe, measurements from anatomical features of the patient, or any other alphanumeric text. Guidance may include visual symbols or indicators. Guidance may also include auditory signals or instructions provided to the user, including recited text or other sounds.

At step 1110, the method 1100 includes receiving an ultrasound image. The received ultrasound image may be of any suitable type. For example, the ultrasound image may be a B-mode image received during live imaging. The ultrasound image may be a cine image, as previously described.

In some aspects, the ultrasound image received at step 1110 may be one of a plurality of ultrasound images that is acquired by the ultrasound probe and received by the processor circuit. For example, the ultrasound imaging system may be configured to receive multiple ultrasound images from the ultrasound imaging probe and may display these multiple ultrasound images in real time or near to real time in succession.

The ultrasound images obtained at step 1110 may be received by the ultrasound system with the ultrasound system implementing various ultrasound parameters. Ultrasound parameters may include, but are not limited to, image capture settings and probe placement settings. Image capture settings may include, but are not limited to, a gain associated with an ultrasound image, a focus associated with an ultrasound image, a depth associated with an ultrasound image, a sector width associated with an ultrasound image, an image plane associated with an ultrasound image including planes of the ultrasound probe in, for example, elevation or azimuth, or any other parameters or settings. Probe placement settings may include the position or orientation of the ultrasound probe including the transducer array, including whether the probe is in the apical view as previously described. In some aspects, the probe position may correspond to the location of the ultrasound probe relative to the patient anatomy and may be quantified by units of distance from various landmarks or axes of the patient anatomy. In some aspects, the probe orientation may be quantified in terms of tilt, slide, rotation, rock, sweep, fan, or in any other terms. In some aspects, any of these parameters listed may be associated with the ultrasound images received while these parameters were implemented and stored in a memory in communication with the processor circuit (e.g., the processor circuit 210) in conjunction with the ultrasound images.

At step 1115, the method 1100 includes analyzing the ultrasound image to identify anatomical features. In some aspects, anatomical features may also be referred to as anatomical points, salient features, or salient points. The detection of anatomical features in the atrial image may be an automatic process, a semi-automatic process, or a manual process. For example, processor circuit 210 may be configured to automatically identify anatomical features after receiving an ultrasound image from the ultrasound probe. In another example, the processor circuit 210 may be configured to identify anatomical features within an ultrasound image in response to receiving an input from the user. In another example, a user of the ultrasound imaging system may identify anatomical features within an ultrasound image. The processor circuit of the ultrasound imaging system may be configured to identify anatomical features in live ultrasound images or in ultrasound images previously acquired and stored in the memory. Identified anatomical features may include the mitral valve annulus, including the left and right mitral annulus points, the left atrial roof, or any other features. The left and right mitral annulus points may be referenced as the anterior and posterior mitral annulus points in some instances.

In some aspects, a salient point may be a feature of the anatomy that is easily identifiable on an ultrasound image. A salient point may be required by a biomarker quantification algorithm, such as a left atrium index algorithm. Typical salient points in the cardiac anatomy include by are not limited to center of the mitral or tricuspid valve, mitral annulus points, heart apex, centroids of the heart chambers (LA, RA, LV, RV), LA/RA roof, left atrial appendage (LAA) centroid, or other features. In some instances, the anatomy can be heart anatomy such as the left atrium, the right atrium, the left ventricle, and/or the right ventricle. In some instances, the anatomy includes any chamber within the body (e.g., heart chambers, stomach, bladder, sinuses, lungs, etc.).

Salient features may be detected by various methods including image processing methods and/or machine learning methods. Methods may include a multi-scale feature extraction algorithm (e.g. SIFT), various scorner, edge, blob, ridge detection algorithms (e.g., Canny, Harris corner detector, Frangi vesselness filter, etc.), segmentation methods (e.g., active contours, model-based segmentation, fully-convolutional deep learning models, etc.), machine learning and most recent deep learning methods including Masked R-CNN, Yolo, U-Net, or any other methods.

In some aspects, the processor circuit 210 (FIG. 2) is configured to determine a location of any of the anatomical features described herein, within the ultrasound image. This location may be stored in a memory as a pixel coordinate or in any other way.

At step 1120, the method 1100 includes generating and displaying visual indicators of anatomical features overlaid over the ultrasound image. The processor circuit may be configured to display, at the locations of the identified anatomical features, corresponding visual indicators. As described with reference to FIG. 6, these visual indicators may highlight for a user the locations of the anatomical features as well as convey various attributes of the anatomical features. For example, visual indicators may correspond to the visibility of the anatomical feature and/or the image quality associated with the region of the ultrasound image of the anatomical feature.

At step 1125, the method 1100 may include receiving a user input moving a visual indicator. In some aspects, a user of the system may determine that the processor circuit of the ultrasound system has incorrectly determined a position of an anatomical feature. For example, as described with reference to FIG. 10, a visual indicator may be placed by the processor circuit within an ultrasound image but may not be placed at the correct position within the image. In such instances, the processor circuit 210 may be configured to receive a user input selecting the correct location for the visual indicator within the ultrasound image. In this way, the processor circuit may verify that the locations of the visual indicators within the ultrasound image are correct. In response to receiving a user input identifying a new location for a visual indicator, the processor circuit 210 move the incorrectly placed visual indicator to the location selected by the user. In some aspects, the processor circuit additionally receives a user input selecting a visual indicator which has been incorrectly placed. In response to such an input, the processor circuit may display various controls to allow the user to select a new location within the ultrasound image. In some aspects, a visual indicator may be moved for any other reason, for example, when the indicator is not at an incorrect location, but may be adjusted for any other purpose.

It is noted that in some aspects, the step 1125 may be an optional step. The step 1125 may be performed at a different time in relation to the other steps of the method 1100. For example, the processor circuit may be configured to receive a user input adjusting the position of a visual indicator associated with an anatomical landmark at any time throughout an ultrasound imaging process.

At step 1130, the method 1100 includes determining a quality index for each anatomical feature. As described with reference to FIG. 6, the quality index of an anatomical feature may correspond the presence of the anatomical feature within the displayed ultrasound image and/or the quality of the image at the location of the anatomical feature. In some aspects, the quality index may include both a geometric quality index and an image quality index. The geometric quality index may correspond to whether or not the anatomical feature is present within the image. The image quality index may correspond to the overall clarity or accuracy of the image at or around the anatomical features. In some aspects, each anatomical feature displayed within an ultrasound image may be assigned an individual quality index. In some aspects, anatomical features which are not displayed within the ultrasound image, but which are expected to be present within the ultrasound image (e.g., for a particular ultrasound imaging procedure or quantification procedure), may also be assigned a quality index.

In some aspects, the processor circuit may determine a global quality index associated with all of the anatomical features present within an ultrasound image or which are expected to be present within an ultrasound image. A global quality index may alternatively be referred to as a universal quality index, a sum quality index, a group quality index, an image quality index, or any other term. A global quality index may be determined by the processor circuit in any suitable way. For example, a global quality index may include a summation of individual quality indices corresponding to anatomical features, or an average of individual quality indices, including a weighted average. Any relationship between individual quality indices of anatomical features and the global quality index may be implemented.

In some aspects, a quality index may include multiple values, with each value corresponding to anatomical features within an ultrasound image. For example, the anterior/left mitral annulus point may correspond to one value of a quality index and the posterior/right mitral annulus point may correspond to a separate value of the same quality index. Similarly, the left atrial roof make correspond to an additional value of the same quality index.

The quality indices described herein may be calculated in any suitable way. In one example, the geometric quality index and image quality index may be combined to produce the quality index.

In some aspects, the geometric quality index may refer to a binary value (e.g., 1 or 0), with 0 corresponding to an anatomical feature not detected within an ultrasound image and 1 corresponding to an anatomical feature detected in the image. In other aspects, the processor circuit may tie the geometric quality index to a level of certainty of presence of the anatomical features. For example, if the processor circuit identifies, by any of the methods previously described, a region of an ultrasound image which includes clear indications of a particular anatomical feature, a high geometric quality index may be assigned to that anatomical feature. This level of certainty may be conveyed as a percentage, as a value within a range, a ranking, or by any other way. If, however, the processor circuit identifies a region bearing little resemblance to an anatomical feature, the processor circuit may assign a low geometric quality index. In some aspects, a machine learning algorithm may be implemented to identify a geometric quality index for anatomical features.

The image quality index may be calculated in any way. In some aspects, a machine learning algorithm may be trained to assign an image quality index value to an anatomical feature detected within an ultrasound image. For example, such a machine learning algorithm may be trained using multiple ultrasound images which have been annotated by experts in the field. In such an instance, these training images may establish a range of values which may be assigned to anatomical features within an ultrasound image. For example, a higher value within the range may correspond to a higher image quality of the anatomical feature and the lower value within the range may correspond to a lower image quality of the anatomical feature. The image quality of an anatomical feature may be determined based on any attributes of the ultrasound image. For example, the definition between light and dark regions of the ultrasound image, including the clarity or contrast of transitions between various regions may determine an image quality of an anatomical feature and may contribute to the value of the quality index assigned to the anatomical feature.

At step 1135, the method 1100 includes comparing each quality index for each anatomical feature to a threshold quality index. In some aspects, the threshold quality index may be determined by the user of the system or may be preprogrammed. For example, the threshold quality index may be based on recommendations from experts in the field. In some aspects, comparing a quality index to the threshold quality index may involve comparing multiple individual quality indices associated with multiple anatomical features with multiple corresponding quality index thresholds. For example, in an instance in which a left mitral annulus point is associated with one quality index, that quality index may be compared with a threshold quality index associated with the left mitral annulus point. Similarly, a quality index of a right mitral annulus may be compared to a corresponding threshold quality index and the quality index of a left atrial roof may be compared with a quality index of a left atrial roof. In aspects in which a global quality index is determined associated with all of the anatomical features within an image, the global quality index maybe compared with a threshold global quality index.

In some aspects, step 1135 of the method 1100 may additionally include displaying an ultrasound image of the analyzed ultrasound images to the user. For example, the processor circuit may be configured to provide, to a display, an ultrasound image with the visual indicators described previously. The visual indicators, in some aspects, may correspond to their respective quality index of each anatomical feature. For example, attributes of the visual indicators displayed may be altered depending on the quality index of the associated anatomical feature. In some aspects, the processor circuit may be configured to display a gradient of colors adjacent to the ultrasound image, the gradient corresponding to the range of quality indices. For example, a color at one extreme of the gradient may correspond to a quality index of 0, or the anatomical feature not being visible within the ultrasound image. By contrast, the color at the other end of the gradient may correspond to an ideal quality index or a quality index that is sufficient to satisfy the threshold quality index. In this way, the color of a visual indicator within the ultrasound image may correspond to the quality index of the anatomical feature that may provide the user with an efficient view of the quality index of each anatomical feature within an ultrasound image. Other visual aspects of visual indicators may be similarly modified. For example, the pattern, shape, color, outline, or any other feature may be modified in a similar way to convey a quality index value independently or relative to other values.

At step 1140, the method 1100 includes determining whether each quality index for each anatomical feature satisfies the threshold quality index. For example, as shown in FIG. 11, if the quality index exceeds the threshold quality index, the processor circuit 210 may proceed to the step 1150 of the method 1100. However, if the quality index does not exceed the threshold, the processor circuit may proceed to step 1145 of the method 1100.

As previously mentioned, the comparison of the quality index with a threshold quality index may include comparing multiple quality indices associated with individual anatomical features with corresponding threshold indices or may include comparing a global quality index to a threshold global quality index. In an instance in which multiple quality indices associated with individual anatomical features are compared with multiple threshold indices, the processor circuit may be configured to proceed to step 1150 when only one quality index exceeds its corresponding index threshold, when a certain number of quality indices exceed their thresholds, or when all quality indices exceed their corresponding thresholds. For example, in an instance in which three anatomical features are expected to be detected within an ultrasound image and one of the anatomical features corresponds to a quality index that does not exceed its corresponding quality index threshold, the processor circuit may proceed to step 1145 of the method 1100. In this way, the processor circuit may implement the steps 1110 through 1140 iteratively until all individual quality indices of each anatomical feature exceed their corresponding quality index threshold.

At step 1145, the method 1100 includes adjusting the ultrasound system settings. The ultrasound system settings described at step 1145 may include any of the ultrasound parameters described with reference to step 1110. For example, in response to any of the quality indices not exceeding corresponding thresholds at step 1140, the processor circuit may determine which settings or parameters of the ultrasound system may be adjusted to result in an expected improvement. This expected improvement may correspond to a predicted higher quality index of any of the anatomical features. For example, the processor circuit may automatically adjust the gain, focus, depth, sector width, image plane, or any other parameter or setting. In some examples, the processor circuit may recommend to a user that any of these parameters or settings be adjusted manually by the user. In some aspects, the processor circuit may automatically adjust any of these parameters or settings in response to receiving a user input. In some aspects, the processor circuit may recommend to a user to adjust the position or orientation of the ultrasound probe, including moving the probe direction, or adjusting the tilt, rotation, or any other feature of the ultrasound probe orientation as previously described. Adjusting the ultrasound system settings at the step 1145 of the method 1100 may include adjusting only one of the ultrasound system settings, or all of the ultrasound system settings, or any number of the ultrasound system settings.

After the ultrasound system settings are adjusted at step 1145, the ultrasound system settings may differ from the settings used to obtain the ultrasound image or plurality of ultrasound images described at step 1110 previously.

After the ultrasound system settings are adjusted at step 1145 of the method 1100, the processor circuit may revert back to the step 1110 and proceed through the remaining steps of the method 1100. For example, a second set of ultrasound images may be received at the step 1110 after completion of the step 1145. This second set of ultrasound images may be analyzed at step 1115 to identify the same anatomical features. At step 1120, the processor circuit may generate and display visual indicators for each of the anatomical features within the second set of ultrasound images. Adjustments may be made at step 1125 and the processor circuit may determine a new quality index for each anatomical feature of the second set of ultrasound images at the step 1130. At the steps 1135 and 1140, the processor circuit may compare the new quality indices to the threshold quality indices. At the step 1140, if the quality indices still do not exceed the threshold, the processor circuit may again proceed to the step 1145 and ultrasound system settings may be automatically or manually adjusted. This process may be repeated until all quality indices exceed their respective threshold indices.

In some aspects, adjusting any of the ultrasound system parameters or settings may include providing an output to a beamformer in communication with the transducer array of the ultrasound probe. Such an output may be a control signal or instruction to the beamformer. The beamformer may be an in-probe beamformer, such as a microbeamformer, or a main beamformer in the console. Using one or more of the adjusted ultrasound parameters, the beamformer can control the array to obtain the ultrasound image data (e.g., adjusting a depth or focus setting may change a signal sent to the array). Using one or more of the ultrasound parameters, the beamformer may also control or affect processing of the ultrasound image data to generate an ultrasound image (e.g., adjusting a gain setting in processing the obtained signal/image data). In some aspects, adjusting the ultrasound system parameters or settings may include providing an output to the display. For example, the output may be a user guidance on a display.

As described herein, the set of ultrasound images received the first time the step 1110 is performed may be acquired with a first set of ultrasound parameters or settings. The set of ultrasound images received the second time the step 1110 is performed may be acquired with the second set ultrasound parameters are settings. Similarly, each time the step 1110 is performed may correspond to a different set of ultrasound parameters or settings.

In some aspects, after the ultrasound system settings have been adjusted at step 1145, the processor circuit may display a new ultrasound image with new visual indicators corresponding to anatomical features and corresponding quality indices. In some aspects, these new visual indicators may be modified to convey to a user of the system a difference in the quality index before and after the ultrasound system settings were adjusted at the step 1145. For example, differences in pattern, color, shape, size, or any other feature of the visual indicators may correspond to an improvement in quality index. This improvement may correspond to an increase in the value of the quality index, a percentage difference, a ratio change, or any other change.

At step 1150, the method 1100 includes acquiring an image loop. An image loop may be multiple ultrasound images acquired in succession. In this way the image loop may illustrate movement or changes in the patient anatomy over time. Acquiring an image loop may include recording a series of ultrasound images after the quality index satisfies the threshold value of the quality index, as previously described. Recording multiple ultrasound images may include storing the multiple ultrasound images in the memory in communication with the processor circuit. This storing of the multiple sound images may correspond to permanently saving the ultrasound images on a non-transitory medium. In this way, multiple ultrasound images stored during a recording process, like the one described at the step 1150, may not be deleted or written over without user input. In some aspects, the recording described at step 1150 may be initiated by a manual input by a user. For example, the user of the ultrasound system may observe, based on the visual indicators shown, that the quality indices of all the anatomical features exceed their corresponding threshold indices. The user may then indicate to the processor circuit to acquire the image loop or store the ultrasound images. In other aspects, the processor circuit may automatically perform the step 1150 in response to the quality indices exceeding their respective thresholds at the step 1140. The image loop or video that is recorded can be used by the processor to perform quantification analysis associated with the anatomy.

Figure 12:
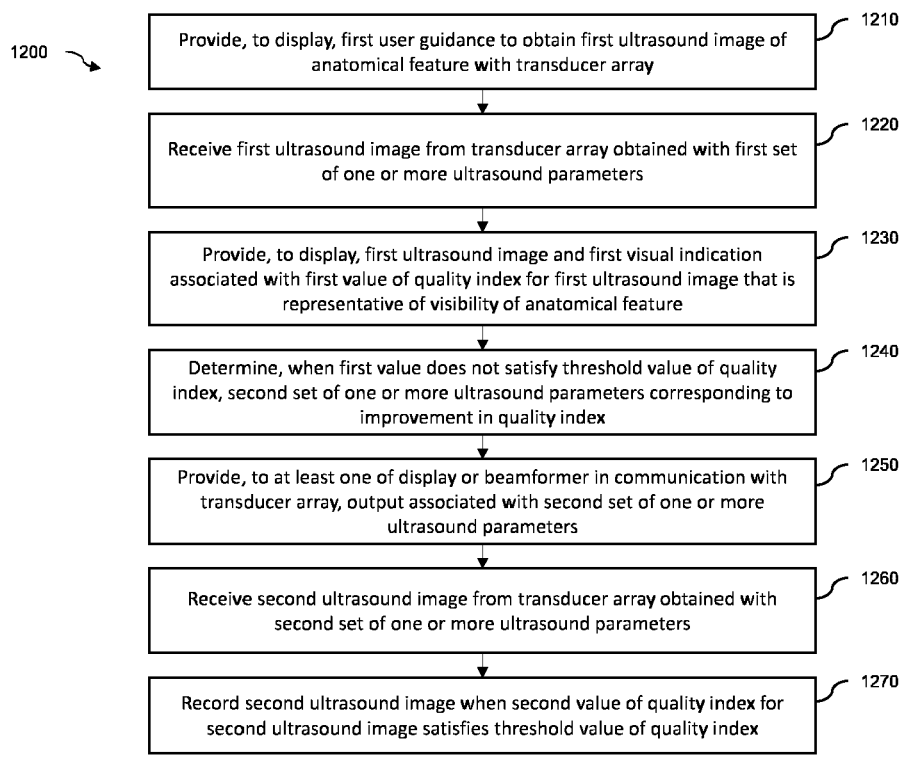
FIG. 12 is a flow diagram of a method of positioning an ultrasound image probe and adjusting ultrasound system parameters for acquiring an ultrasound image loop, according to aspects of the present disclosure.

FIG. 12 is a flow diagram of a method 1200 of positioning an ultrasound image probe and adjusting ultrasound system parameters for acquiring an ultrasound image loop, according to aspects of the present disclosure. As illustrated, the method 1200 includes a number of enumerated steps, but aspects of the method 1200 may include additional steps before, after, or in between the enumerated steps. In some aspects, one or more of the enumerated steps may be omitted, performed in a different order, or performed concurrently. The steps of the method 1200 can be carried out by any suitable component within the system 100 and all steps need not be carried out by the same component. In some aspects, one or more steps of the method 1200 can be performed by, or at the direction of, a processor circuit, including, e.g., the processor 116 (FIG. 1), the processor 134 (FIG. 1), the processor 260 (FIG. 2) or any other suitable component.

At step 1210, the method 1200 includes providing, to the display, a first user guidance to obtain a first ultrasound image of an anatomical feature with the transducer array. The step 1210 of the method 1200 may include any aspects of the step 1105 of the method 1100. As previously described, the user guidance to obtain an ultrasound image may include guidance to position the ultrasound probe to acquire an apical view of the patient's heart. The guidance may include illustrations, text, or any other forms of communication. The first ultrasound image of the step 1105 may refer to a single ultrasound image or may be one of a plurality of ultrasound images. The first ultrasound image described at step 1210 may be one ultrasound image of a stream of ultrasound images. For example, the first ultrasound image may be an image obtained during a live imaging mode or live imaging procedure. In this way, the first ultrasound image may be one of multiple ultrasound images obtained in real time and may or not be saved as they are acquired or received. In some instances, a live imaging procedure can include a closed-loop control system. In some instances, the first ultrasound image may be an image obtained in a fixed sequential behavior.

At step 1220, the method 1200 includes receiving the first ultrasound image from the transducer array. The first ultrasound image is obtained with a first set of one or more ultrasound parameters. The step 1210 of the method 1200 may include any aspects of the step 1110 of the method 1100. As explained, any ultrasound images obtained by the ultrasound imaging system may be associated with one or more ultrasound parameters.

At step 1230, the method 1200 includes providing, to the display, the first ultrasound image and a first visual indication associated with a first value of a quality index for the first ultrasound image. The quality index is representative of a visibility of the anatomical feature. The step 1230 of the method 1200 may include any aspects of the steps 1120 and/or 1130 of the method 1100. At step 1230, the processor circuit may automatically identify one or more of the anatomical features and generate visual indications corresponding to the identified anatomical features. An ultrasound image with these visual indications may be displayed to a user.

At step 1240, the method 1200 includes determining, when the first value does not satisfy a threshold value of the quality index, a second set of the one or more ultrasound parameters corresponding to an improvement in the quality index. The step 1240 of the method 1200 may include any aspects of the steps 1135 through 1145 of the method 1100. To ensure that the field of view of the ultrasound imaging probe includes all necessary features of the anatomy and to ensure that the anatomical features of the anatomy are clearly captured, the processor circuit may confirm that each quality index of each corresponding anatomical feature exceeds a threshold.

At step 1250, the method 1200 includes providing, to at least one of the display or a beamformer in communication with the transducer array, an output associated with the second set of the one or more ultrasound parameters. The step 1250 of the method 1200 may include any aspects of the step 1145 of the method 1100. In response to any quality index of any anatomical feature of the patient anatomy not exceeding its corresponding threshold, the processor circuit may determine that one or more parameters of the ultrasound system should be adjusted. To make this adjustment automatically, the processor circuit may send an output to the beamformer instructing the beamformer to adjust any parameter of the ultrasound imaging system, including but not limited to a depth setting, focus setting, gain setting, plane of elevation, azimuth or an oblique plane, or any other parameter or setting. To prompt a manual adjustment of any of these parameters or an adjustment to the position or orientation of the ultrasound probe, the processor circuit may provide an output to the display instructing the user of the system to perform the adjustment. As explained, ultrasound system parameters may be adjusted or interactively changed at step 1250 in response to the quality index of received images. In this way, the ultrasound system provides guidance or assistance to ensure good quality ultrasound image acquisition. As explained previously, in instances in which the first ultrasound image is part of a continuous live imaging procedure or closed-loop control system, each incoming image may be verified against a set of parameters and if these parameters do not satisfy one or more thresholds or a combination of thresholds, the new images will be acquired with an updated set of imaging parameters to improve the quality index.

At step 1260, the method 1200 includes receiving a second ultrasound image from the transducer array, wherein the second ultrasound image is obtained with the second set of the one or more ultrasound parameters. The step 1260 of the method 1200 may include any aspects of the step 1110 of the method 1100. At step 1260, a different set of ultrasound images is received by the processor circuit. The set of ultrasound images received at the step 1260 may be images acquired after making an adjustment to one or more of the ultrasound imaging system parameters as described at step 1250. In this way, the ultrasound images received at step 1220 may be associated with a different set of ultrasound imaging system parameters than the ultrasound images received at step 1260.

At step 1270, the method 1200 includes recording the second ultrasound image when a second value of the quality index for the second ultrasound image satisfies the threshold value of the quality index. The step 1270 of the method 1200 may include any aspects of the step 1150 of the method 1100. The image stored at the step 1270 may be one of a plurality of ultrasound images, the plurality of ultrasound images forming an image loop or video of ultrasound images through at least one cardiac cycle. The image loop or video can be used by the processor to perform quantification analysis associated with the anatomy.

It is noted that any of the steps of the method 1200 described above may be performed automatically or semi-automatically. For example, the processor circuit may be configured to perform any of the steps of the method 1200 automatically in response to the completion of the previous step or may be configured to perform any of the steps of the method 1200 after receiving an input from the user to perform the respective step.

Persons skilled in the art will recognize that the apparatus, systems, and methods described above can be modified in various ways. Accordingly, persons of ordinary skill in the art will appreciate that the aspects encompassed by the present disclosure are not limited to the particular exemplary aspects described above. In that regard, although illustrative aspects have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. An ultrasound imaging system, comprising:
a processor configured for communication with a transducer array and a display, wherein the processor is configured to:
provide, to the display, a first user guidance to obtain a first ultrasound image of an anatomical feature with the transducer array;
receive the first ultrasound image from the transducer array, wherein the first ultrasound image is obtained with a first set of one or more ultrasound parameters;
provide, to the display, the first ultrasound image and a first visual indication associated with a first value of a quality index for the first ultrasound image, wherein the quality index is representative of a visibility of the anatomical feature;
determine, when the first value does not satisfy a threshold value of the quality index, a second set of the one or more ultrasound parameters corresponding to an improvement in the quality index;
provide, to at least one of the display or a beamformer in communication with the transducer array, an output associated with the second set of the one or more ultrasound parameters;
receive a second ultrasound image from the transducer array, wherein the second ultrasound image is obtained with the second set of the one or more ultrasound parameters; and
record the second ultrasound image when a second value of the quality index for the second ultrasound image satisfies the threshold value of the quality index.

2. The system of claim 1,
wherein the output associated with the second set of the one or more ultrasound parameters comprises a second user guidance for a user to manually change the one or more ultrasound parameters, and
wherein the second user guidance is provided to the display.

3. The system of claim 1,
wherein the output associated with the second set of the one or more ultrasound parameters comprises a control signal to automatically change the one or more ultrasound parameters, and
wherein the control signal is provided to the beamformer.

4. The system of claim 1, wherein one or more ultrasound parameters comprise one or more of:
a depth associated with an ultrasound image;
a gain associated with the ultrasound image;
a focus associated with the ultrasound image;
a sector width associated with the ultrasound image;
an imaging plane associated with the ultrasound image;
a position of an ultrasound probe comprising the transducer array; or
an orientation of the ultrasound probe.

5. The system of claim 1, wherein the first visual indication is overlaid on the first ultrasound image.

6. The system of claim 5, wherein the first visual indication is positioned at a location of the anatomical feature in the first ultrasound image.

7. The system of claim 1, wherein the processor is configured to provide, to the display, the second ultrasound image and a second visual indication associated with the second value of the quality index.

8. The system of claim 7, wherein a difference between the first visual indication and the second visual indication is representative of the improvement in the quality index.

9. The system of claim 1, wherein the anatomical feature comprises a plurality of anatomical features that are different from one another.

10. The system of claim 9, wherein the plurality of anatomical features are distributed around a perimeter of an anatomy such that the quality index is representative of a completeness of a view of the anatomy.

11. The system of claim 10,
wherein the anatomy comprises a left atrium, and
wherein the plurality of anatomical features comprises a left mitral annulus point, a right mitral annulus point, and a left atrial roof.

12. The system of claim 1,
wherein the processor is configured to receive a user input to enter an imaging mode associated with the anatomical feature,
wherein the processor is configured to provide the first user guidance only after the imaging mode is entered.

13. The system of claim 1,
wherein the first ultrasound image and the second ultrasound image are obtained during live imaging, and
wherein the processor is configured to determine the second set of the one or more ultrasound parameters during the live imaging.

14. The system of claim 1,
wherein the first ultrasound image comprises a first plurality of ultrasound images, and
wherein the second ultrasound image comprises a second plurality of ultrasound images.

15. The system of claim 1, further comprising:
an ultrasound probe comprising the transducer array.

16. An ultrasound imaging method, comprising:
providing, to a display in communication with a processor, a first user guidance to obtain a first ultrasound image of an anatomical feature with a transducer array in communication with the processor;
receiving, with the processor, the first ultrasound image from the transducer array, wherein the first ultrasound image is obtained with a first set of one or more ultrasound parameters;
providing, with the processor, the first ultrasound image and a first visual indication associated with a first value of a quality index for the first ultrasound image to the display, wherein the quality index is representative of a visibility of the anatomical feature;
determining, with the processor, a second set of the one or more ultrasound parameters corresponding to an improvement in the quality index, when the first value does not satisfy a threshold value of the quality index;
providing, with the processor, an output associated with the second set of the one or more ultrasound parameters to at least one of the display or a beamformer in communication with the transducer array;
receiving, with the processor, a second ultrasound image from the transducer array, wherein the second ultrasound image is obtained with the second set of the one or more ultrasound parameters; and
recording, with the processor, the second ultrasound image when a second value of the quality index for the second ultrasound image satisfies the threshold value of the quality index.

* * * * *